(12) United States Patent
Saha et al.

(10) Patent No.: US 10,690,251 B2
(45) Date of Patent: Jun. 23, 2020

(54) LABYRINTH SEAL SYSTEM AND AN ASSOCIATED METHOD THEREOF

(71) Applicant: General Electric Company, Schenectady, NY (US)

(72) Inventors: Krishnendu Saha, Bangalore (IN); Deoras Prabhudharwadkar, Bangalore (IN); Ashok Gopinath, Bangalore (IN)

(73) Assignee: General Electric Company, Schenectady, NY (US)

( * ) Notice: Subject to any disclaimer, the term of this patent is extended or adjusted under 35 U.S.C. 154(b) by 312 days.

(21) Appl. No.: 15/696,489

(22) Filed: Sep. 6, 2017

(65) Prior Publication Data
US 2018/0087669 A1 Mar. 29, 2018

(30) Foreign Application Priority Data
Sep. 23, 2016 (IN) .............................. 201641032583

(51) Int. Cl.
*F16J 15/447* (2006.01)
*F01D 11/02* (2006.01)
(Continued)

(52) U.S. Cl.
CPC ......... *F16J 15/4476* (2013.01); *F01D 11/001* (2013.01); *F01D 11/02* (2013.01);
(Continued)

(58) Field of Classification Search
CPC ........ F01D 11/001; F01D 11/02; F01D 11/04; F01D 11/08; F01D 11/12; F01D 11/122;
(Continued)

(56) References Cited

U.S. PATENT DOCUMENTS 4,218,066 A 8/1980 Ackermann
4,416,457 A 11/1983 McGinnis et al.
(Continued)

FOREIGN PATENT DOCUMENTS

EP 1396612 A1 3/2004
WO 2001066983 A1 9/2001

OTHER PUBLICATIONS

India Examination Report for IN Application No. 201641032583 dated Aug. 26, 2019; 6 pgs.
(Continued)

*Primary Examiner* — Scott J Walthour
*Assistant Examiner* — Colin J Paulauskas
(74) *Attorney, Agent, or Firm* — Fletcher Yoder, P.C.

(57) ABSTRACT

Labyrinth seal system includes stationary component and rotatable component, where one of the stationary and rotatable components includes teeth. The labyrinth seal system further includes abradable component coupled to surface of other of the stationary and rotatable components and disposed facing the teeth. The abradable component includes a plurality of honeycomb cells disposed adjacent to each other along axial direction and circumferential direction. Each honeycomb cell includes a plurality of radial sidewalls, where each radial sidewall includes first portion and second portion. The first portion is coupled to the surface and the second portion extends from the first portion towards clearance defined between the stationary and rotatable components. The second portion is bent relative to radial axis of the labyrinth seal system.

23 Claims, 19 Drawing Sheets

(51) Int. Cl.
*F01D 11/10* (2006.01)
*F01D 11/00* (2006.01)
*F16J 15/44* (2006.01)
*F02C 3/04* (2006.01)

(52) U.S. Cl.
CPC ............ *F01D 11/10* (2013.01); *F16J 15/444* (2013.01); *F02C 3/04* (2013.01); *F05D 2220/32* (2013.01); *F05D 2230/237* (2013.01); *F05D 2230/30* (2013.01); *F05D 2240/12* (2013.01); *F05D 2240/14* (2013.01); *F05D 2240/307* (2013.01); *F05D 2240/35* (2013.01); *F05D 2240/60* (2013.01); *F05D 2250/283* (2013.01)

(58) Field of Classification Search
CPC ...... F01D 11/125; F01D 11/127; F01D 25/12; F05D 2240/11; F05D 2240/35; F05D 2240/55; F05D 2240/60; F05D 2250/283; F16J 15/3404; F16J 15/441; F16J 15/444; F16J 15/447–453; F04D 29/124; F04D 29/164; F04D 29/584; F04D 25/5853; F02C 7/28; F23R 2900/00012
See application file for complete search history.

(56) References Cited

U.S. PATENT DOCUMENTS

| | | |
|---|---|---|
| 4,477,089 A | 10/1984 | Hoffman et al. |
| 4,623,298 A | 11/1986 | Hallinger et al. |
| 5,029,876 A | 7/1991 | Orlando et al. |
| 5,037,114 A | 8/1991 | Gray |
| 5,096,376 A | 3/1992 | Mason et al. |
| 5,326,647 A | 7/1994 | Merz et al. |
| 5,540,447 A | 7/1996 | Shultz et al. |
| 6,145,844 A | 11/2000 | Waggott |
| 6,739,593 B2 | 5/2004 | Fried |
| 6,827,350 B2 | 12/2004 | Walcott et al. |
| 8,360,712 B2 | 1/2013 | Deo et al. |
| 8,858,162 B2 | 10/2014 | Manzoori |
| 2006/0228209 A1 | 10/2006 | Couture et al. |
| 2007/0069477 A1 | 3/2007 | Li et al. |
| 2007/0132193 A1 | 6/2007 | Wolfe et al. |
| 2008/0260522 A1* | 10/2008 | Alvanos ............... F01D 11/001 415/173.4 |
| 2009/0072488 A1 | 3/2009 | Ramerth et al. |
| 2010/0034646 A1 | 2/2010 | Magara et al. |
| 2012/0003080 A1 | 1/2012 | Deo et al. |
| 2014/0321993 A1 | 10/2014 | Lusted et al. |
| 2015/0260294 A1* | 9/2015 | Nakaniwa ............... F01D 11/02 277/414 |
| 2018/0355979 A1* | 12/2018 | Nishikawa ............. F01D 5/225 |
| 2018/0372158 A1* | 12/2018 | Nishikawa ............. F16J 15/447 |

OTHER PUBLICATIONS

Ludwig et al., "Sealing technology for aircraft gas turbine engines", National Aeronautics and Space Administration, Oct. 21-24, 1974, Conference Location: San Diego, California.

Zhang et al., "Influence of Tooth Position and Clearances on Leakage in Labyrinth Seal in Turbine", Power and Energy Engineering Conference (APPEEC), 2011 Asia-Pacific, pp. 1-6, Mar. 25-28, 2011, Conference Location: Wuhan.

* cited by examiner

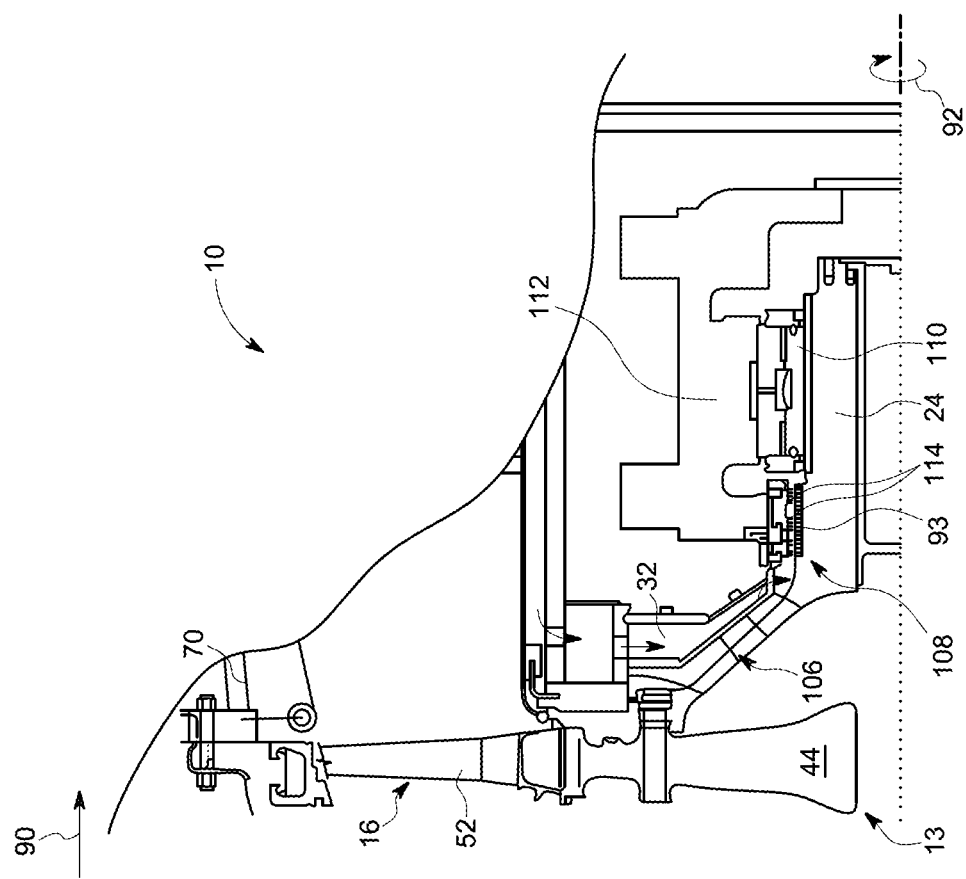

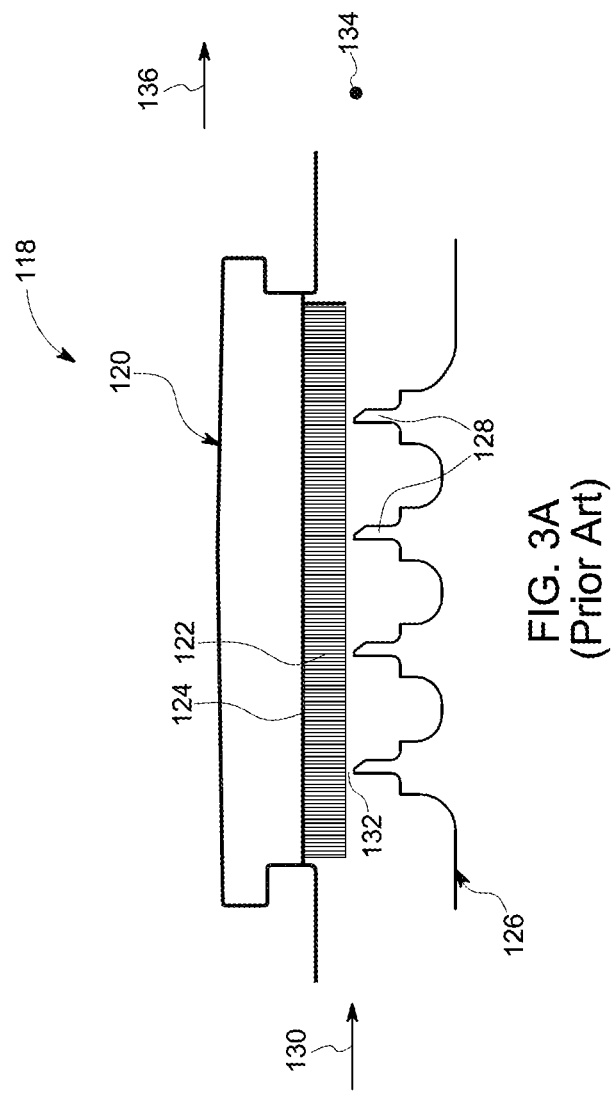

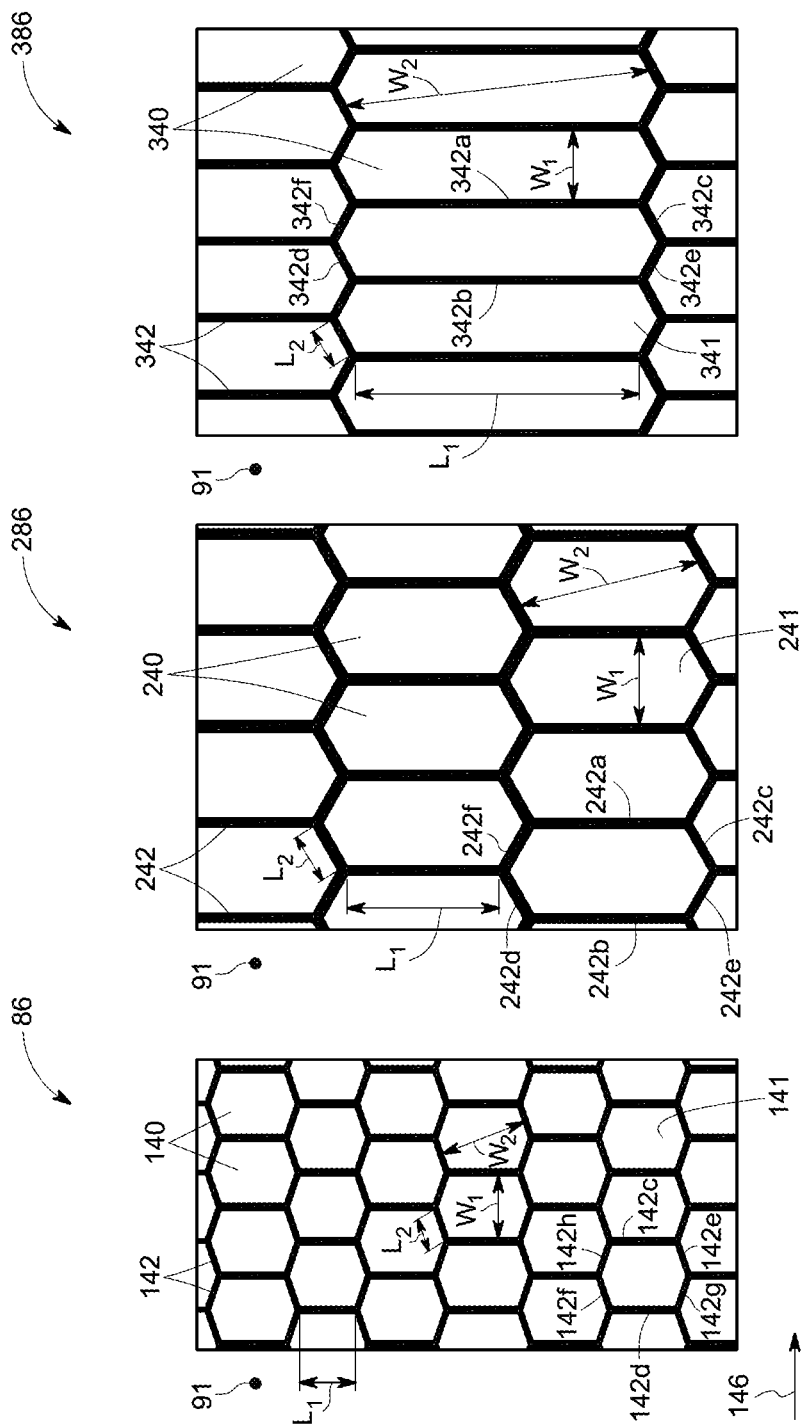

LABYRINTH SEAL SYSTEM AND AN ASSOCIATED METHOD THEREOF

BACKGROUND

Embodiments of the present invention relate to a seal system for turbomachines, and more specifically, to a labyrinth seal system including an abradable component having a plurality of honeycomb cells.

A labyrinth seal is often used to minimize leakage of a fluid through a clearance defined between a stationary component and a rotatable component of a turbomachine. The labyrinth seal includes teeth formed on the rotatable component, for obstructing the flow and minimizing the leakage of the fluid through the clearance. During certain transient operating conditions of the turbomachines, such as startup, shutdown, or load variations, an axial movement of the rotatable component may occur in relation to the stationary component. Such an axial movement may cause the teeth of the rotatable component to slide or rub against the stationary component, resulting in abrasion of the teeth. The abrasion of the teeth may affect the seal performance causing increased leakage of the fluid through the clearance.

Some labyrinth seals include modified geometry of teeth in the rotatable component so as to minimize the contact with the stationary component. However, such a modification of the geometry may cause higher frictional heating in the turbomachines. In certain other conventional labyrinth seals, a wide clearance may be formed between a stationary component and a rotatable component. Such a wide clearance results in increased leakage of the fluid through the clearance.

Accordingly, there is a need for an enhanced labyrinth seal system and an associated method.

BRIEF DESCRIPTION

In accordance with one exemplary embodiment, a labyrinth seal system is disclosed. The labyrinth seal system includes a stationary component and a rotatable component, where one of the stationary component and rotatable components includes teeth. The labyrinth seal system further includes an abradable component coupled to a surface of other of the stationary and rotatable components and disposed facing the teeth. The abradable component includes a plurality of honeycomb cells disposed adjacent to each other along an axial direction and a circumferential direction of the abradable component. Each honeycomb cell includes a plurality of radial sidewalls, where each radial sidewall includes a first portion and a second portion. The first portion is coupled to the surface and the second portion extends from the first portion towards a clearance defined between the stationary component and the rotatable component. The second portion is bent relative to a radial axis of the labyrinth seal system.

In accordance with another exemplary embodiment, a gas turbine engine is disclosed. The gas turbine engine includes a compressor, a combustor, a turbine, and a labyrinth seal system. The combustor is coupled to the compressor. The turbine is coupled to the combustor and the compressor. The labyrinth seal system is disposed at a pre-defined location in the gas turbine engine. The labyrinth seal system includes a stationary component and a rotatable component, where one of the stationary and rotatable components includes teeth. The labyrinth seal system further includes an abradable component coupled to a surface of other of the stationary and rotatable components and disposed facing the teeth. The abradable component includes a plurality of honeycomb cells disposed adjacent to each other along an axial direction and a circumferential direction of the abradable component. Each honeycomb cell includes a plurality of radial sidewalls, where each radial sidewall includes a first portion and a second portion. The first portion is coupled to the surface and the second portion extends from the first portion towards a clearance defined between the stationary component and the rotatable component. The second portion is bent relative to a radial axis of the labyrinth seal system.

In accordance with yet another exemplary embodiment, a method of manufacturing a labyrinth seal system is disclosed. The method involves receiving a stationary component and a rotatable component, where one of the stationary and rotatable components includes teeth. Further, the method involves manufacturing an abradable component using an additive manufacturing technique. The method further involves coupling the abradable component to a surface of other of the stationary and rotatable components and disposed facing the teeth. The abradable component includes a plurality of honeycomb cells disposed adjacent to each other along an axial direction and a circumferential direction of the abradable component. Each honeycomb cell includes a plurality of radial sidewalls, where each radial sidewall includes a first portion and a second portion. The first portion is coupled to the surface and the second portion extends from the first portion towards a clearance defined between the stationary component and the rotatable component. The second portion is bent relative to a radial axis of the labyrinth seal system.

DRAWINGS

These and other features and aspects of embodiments of the present invention will become better understood when the following detailed description is read with reference to the accompanying drawings in which like characters represent like parts throughout the drawings, wherein:

FIG. 2 is a schematic view of another portion of the gas turbine engine in accordance with the exemplary embodiment of FIG. 1;

FIG. 3A is a schematic diagram of a conventional labyrinth seal system;

FIG. 8 is a schematic top view of an abradable component having a plurality of regular hexagonal shaped cells in accordance with one exemplary embodiment;

FIG. 9 is a schematic top view of an abradable component having a plurality of compressed hexagonal shaped cells in accordance with one exemplary embodiment;

FIG. 10 is a schematic top view of an abradable component having a plurality of compressed hexagonal shaped cells in accordance with another exemplary embodiment;

DETAILED DESCRIPTION

Embodiments of the present invention discussed herein relate to a labyrinth seal system for turbomachines such as a gas turbine engine. The labyrinth seal system is configured to control leakage of a flow of a first fluid portion through a clearance defined between an abradable component and one of a stationary component and a rotatable component including teeth. In one embodiment, the first fluid portion flows along an axial direction of the abradable component. In some embodiments, the labyrinth seal system is configured to prevent a flow of a second fluid portion entering into the plurality of honeycomb cells of the abradable component and thereby prevent generation of frictional heat. In such embodiments, the second fluid portion flows along a circumferential direction of the abradable component.

The labyrinth seal system includes a stationary component and a rotatable component, where one of the stationary and rotatable components includes teeth. The labyrinth seal system further includes an abradable component coupled to a surface of other of the stationary and rotatable components and disposed facing teeth. The abradable component includes a plurality of honeycomb cells disposed adjacent to each other along the axial direction and the circumferential direction of the abradable component. Each honeycomb cell includes a plurality of radial sidewalls, where each radial sidewall includes a first portion and a second portion. The first portion is coupled to the surface and the second portion extends from the first portion towards a clearance defined between the stationary component and the rotatable component. The second portion is bent relative to a radial axis of the labyrinth seal system.

Figure 1:
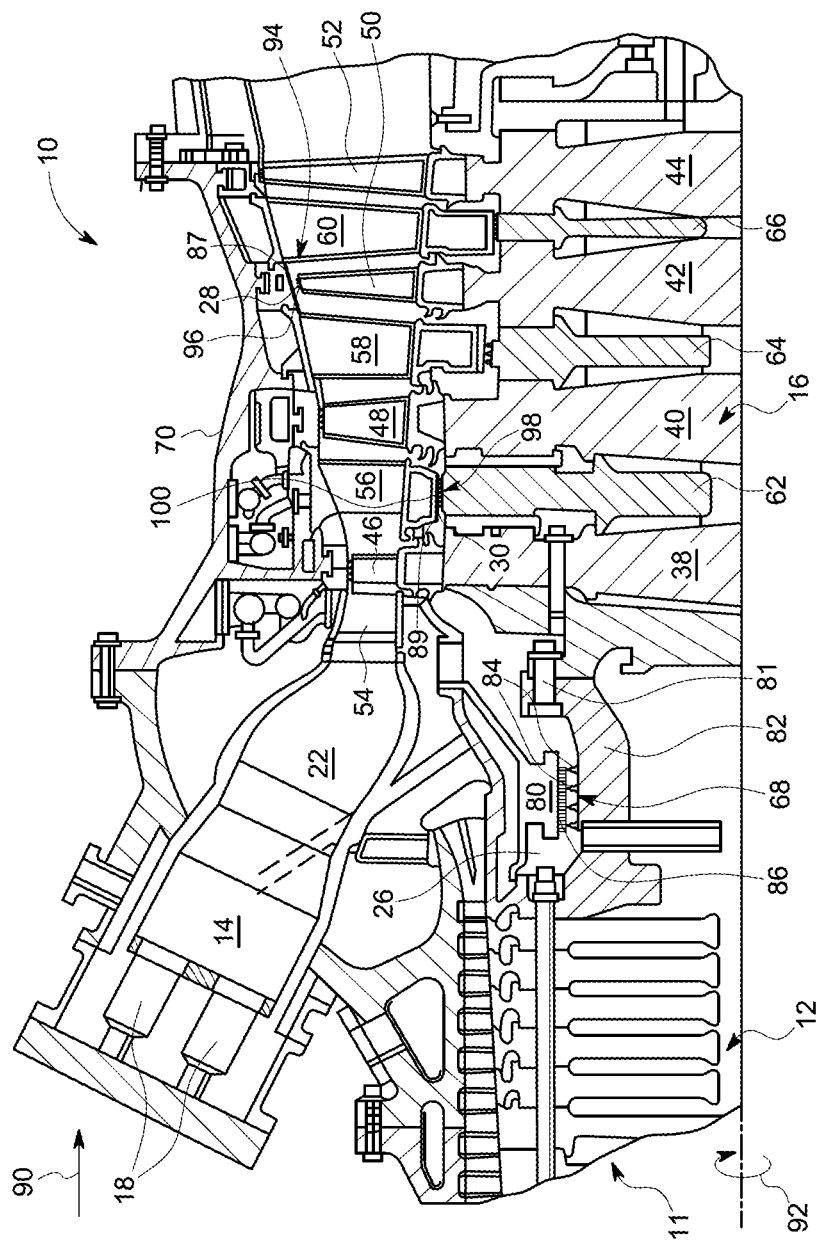
FIG. 1 is a cross-sectional view of a portion of a gas turbine engine in accordance with one exemplary embodiment.

FIG. 1 illustrates a cross-sectional view of a portion 11 of a gas turbine engine 10 in accordance with one exemplary embodiment of the present invention. The gas turbine engine 10 includes a compressor 12, a combustor 14, and a turbine 16. In the illustrated embodiment, the compressor 12 is a multistage compressor and the turbine 16 is a multistage turbine. The compressor 12 is coupled to the combustor 14. The turbine 16 is coupled to the combustor 14 and the compressor 12. A first leakage flow path 26 extends from the compressor 12 to the turbine 16 bypassing the combustor 14. During operation, the compressor 12 is configured to receive a fluid such as air and compress the received fluid to generate a compressed fluid. The combustor 14 is configured to receive the compressed fluid from the compressor 12 and a fuel such as natural gas from a plurality of fuel injectors 18 and burn the fuel and the compressed fluid within a combustion zone 22 to generate exhaust gases. The turbine 16 is configured to receive the exhaust gases from the combustor 14 and expand the exhaust gases to convert energy of the exhaust gases to work. The turbine 16 is configured to drive the compressor 12 through a rotatable component 82.

In the illustrated embodiment, the turbine 16 includes four-stages represented by four rotors 38, 40, 42, 44 connected to the rotatable component 82 for rotation therewith. Each rotor 38, 40, 42, 44 includes airfoils (rotor blades) 46, 48, 50, 52, which are arranged alternately between stator blades 54, 56, 58, 60 (nozzles) respectively. The stator blades 54, 56, 58, 60 are fixed to a casing 70 of the turbine 16. The turbine 16 further includes three spacer wheels 62, 64, 66 coupled to and disposed alternately between rotors 38, 40, 42, 44. Specifically, the turbine 16 includes a first stage having the stator blade 54 and the rotor blade 46, a second stage having the stator blade 56, the spacer wheel 62, and the rotor blade 48, a third stage having the stator blade 58, the spacer wheel 64, and the rotor blade 50, and a fourth stage having the stator blade 60, the spacer wheel 66, and the rotor blade 52.

The gas turbine engine 10 further includes a labyrinth seal system 68 disposed at a pre-defined location in the turbine 16. In the illustrated embodiment, the pre-defined location is the first leakage flow path 26 extending from the compressor 12 to the turbine 16, bypassing the combustor 14. The labyrinth seal system 68 includes a stationary component 80, a rotatable component 82 having teeth 84, and an abradable component 86 coupled to the stationary component 80, facing the teeth 84. The abradable component 86 includes a plurality of honeycomb cells (not shown in FIG. 1) disposed adjacent to each other along an axial direction 90 and a circumferential direction 92 of the abradable component 86. Further, each honeycomb cell extends along a circumferential direction 92 of the abradable component 86, facing the rotatable component 82. In the illustrated embodiment, the stationary component 80 is a barrel disposed below the combustor 14 and extends from the compressor 12 to the turbine 16. The rotatable component 82 is a mid-shaft of the gas turbine engine 10, which connects the turbine 16 to the compressor 12.

The labyrinth seal system 68 is configured to control leakage of the compressed fluid flowing through a clearance (not labeled in FIG. 1) defined between the abradable component 86 and the rotatable component 82. The labyrinth seal system 68 is discussed in greater detail below with reference to subsequent figures.

A labyrinth seal system 94 is disposed in another location in the turbine 16. In the illustrated embodiment, the labyrinth seal system 94 defines a second leakage flow path 28 extending between a tip 96 of the rotor blade 50 and the casing 70. The labyrinth seal system 94 is similar to the labyrinth seal system 68, except that the casing 70 is a stationary component and the rotor blade 50 is a rotatable component. In such embodiments, the labyrinth seal system 94 is configured to control leakage of the exhaust gases through a tip clearance, bypassing the rotor blade 50. The tip clearance is defined between the rotor blade 50 and the abradable component 87 coupled to the casing 70. In certain other embodiments, the labyrinth seal system 94 may be disposed at other locations in the turbine 16 to defines leakage flow paths between a tip of the respective rotor blades 46, 48, 52 and the casing 70.

Further, a labyrinth seal system 98 defines a third leakage flow path 30 extending between a tip 100 of the stator blade 56 and the spacer wheel 62 of the turbine 16. The labyrinth seal system 98 is similar to the labyrinth seal system 68, except that the stator blade 56 is a stationary component and the spacer wheel 62 is a rotatable component. The labyrinth seal system 98 is configured to control leakage of the exhaust gases through a clearance defined between the spacer wheel 62 and the abradable component 89 coupled to the stator blade 56. In certain other embodiments, the labyrinth seal system 98 may be disposed at other locations in the turbine 16 to define leakage flow paths between a tip of the respective stator blades 58, 60 and the respective spacer wheels 64, 66.

FIG. 2 illustrates a cross-sectional view of another portion 13 of the gas turbine engine 10 in accordance with the exemplary embodiment of present invention. In the illustrated embodiment, the turbine 16 includes the rotor blade 52 mounted on the rotor 44. The rotor 44 is coupled to an aft-shaft 24 via a connecting element 106. The gas turbine engine 10 includes a labyrinth seal system 108 disposed at a predefined location in the turbine 16. The labyrinth seal system 108 includes the aft-shaft 24, the bearing housing 112 having teeth 114, and an abradable component 86 coupled to the aft-shaft 24, facing the teeth 114. The aft-shaft shaft 24 is supported by a bearing 110 disposed within the bearing housing 112. The labyrinth seal system 108 defines to define a fourth leakage flow path 32 extending between the bearing housing 112 and the aft-shaft 24. The abradable component 86 includes a plurality of honeycomb cells (not shown in FIG. 2) disposed adjacent to each other along the axial direction 90 and the circumferential direction 92 of the abradable component 86.

The labyrinth seal system 108 is configured to control leakage of a portion of the exhaust gases through a clearance defined between the abradable component 86 and the aft-shaft 24. The labyrinth seal system 108 is discussed in greater detail below with reference to the embodiment of FIG. 20. Although specific locations are discussed herein, it should be noted herein that the labyrinth seal system may be used in other suitable locations which require control of leakage flow of a fluid.

FIG. 3A is a schematic diagram of a conventional labyrinth seal system 118. The conventional labyrinth seal system 118 includes a stationary component 120, a stator 122 coupled to a surface 124 of the stationary component 120, and a rotatable component 126 having teeth 128 spaced apart from each other and facing the stator 122. The conventional labyrinth seal system 118 is configured to regulate leakage flow of a fluid 130 along an axial direction 136 through a clearance 132 defined between the stator 122 and the teeth 128. During operation, the rotatable component 126 is configured to rotate along a circumferential direction 134. The stator 122 and the teeth 128 are configured to regulate the leakage of the fluid 130.

Figure 3B:
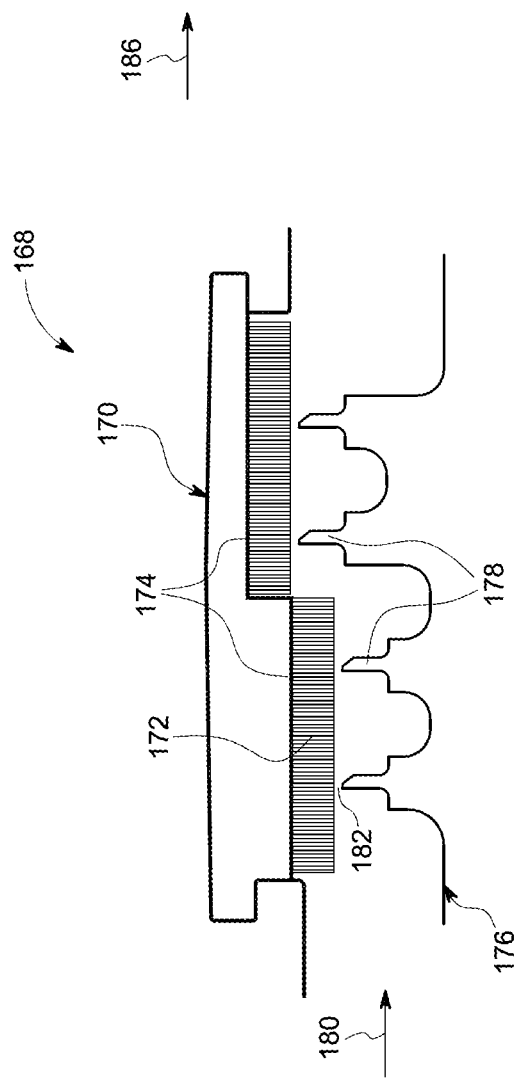
FIG. 3B is a schematic diagram of another conventional labyrinth seal system.

FIG. 3B is a schematic diagram of another conventional labyrinth seal system 168. The conventional labyrinth seal system 168 includes a stationary component 170, a stator 172 coupled to a stepped surface 174 of the stationary component 170, and a rotatable component 176 having teeth 178 spaced apart from each other and facing the stator 172. The conventional labyrinth seal system 168 is configured to control leakage flow of a fluid 180 through a clearance 182 defined between the stator 172 and the teeth 178. The stator 172 and the teeth 178 are configured to regulate the leakage flow through the clearance 182 by recirculating a portion of the leakage flow. An axial movement 186 of the rotatable component 176 during transient operation conditions may result in teeth 178 contacting the stator 172, thereby resulting in damage to the stator 172 and the teeth 178.

Figure 4:
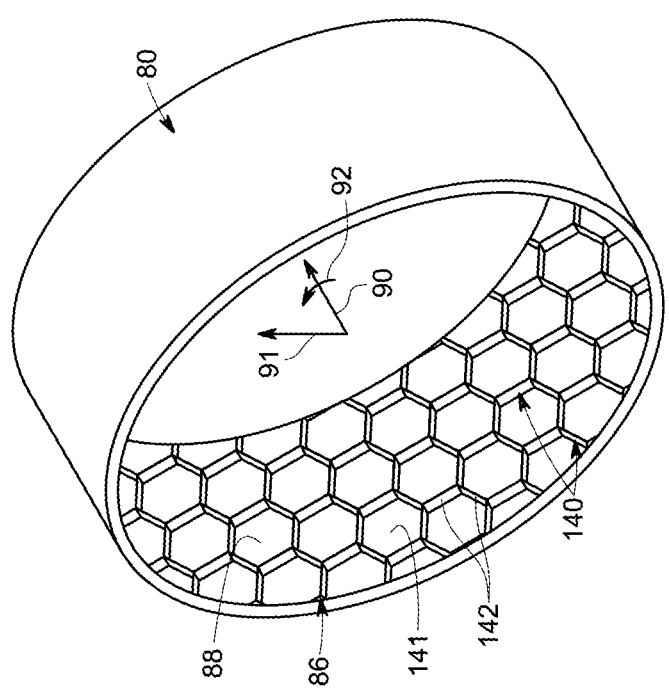
FIG. 4 is a perspective view of a stationary component and an abradable component of a labyrinth seal system in accordance with the exemplary embodiment of FIG. 1.

FIG. 4 is a perspective view of the stationary component 80 and the abradable component 86 of the labyrinth seal system 68 in accordance with the exemplary embodiment of FIG. 1. The abradable component 86 is coupled to a surface 88 (inner surface) of the stationary component 80. The abradable component 86 includes a plurality of honeycomb cells 140 disposed adjacent to each other along the axial direction 90 and the circumferential direction 92. Each honeycomb cell 140 has a through-hole 141 (i.e. groove) defined by a plurality of radial sidewalls 142. Each radial sidewall 142 extends along a radial direction 91 of the abradable component 86. In one embodiment, the abradable component 86 is made of a first material and the stationary component 80 is made of a second material different from the first material. In another embodiment, the abradable component 86 and the stationary component 80 are made of the same material.

Figure 5:
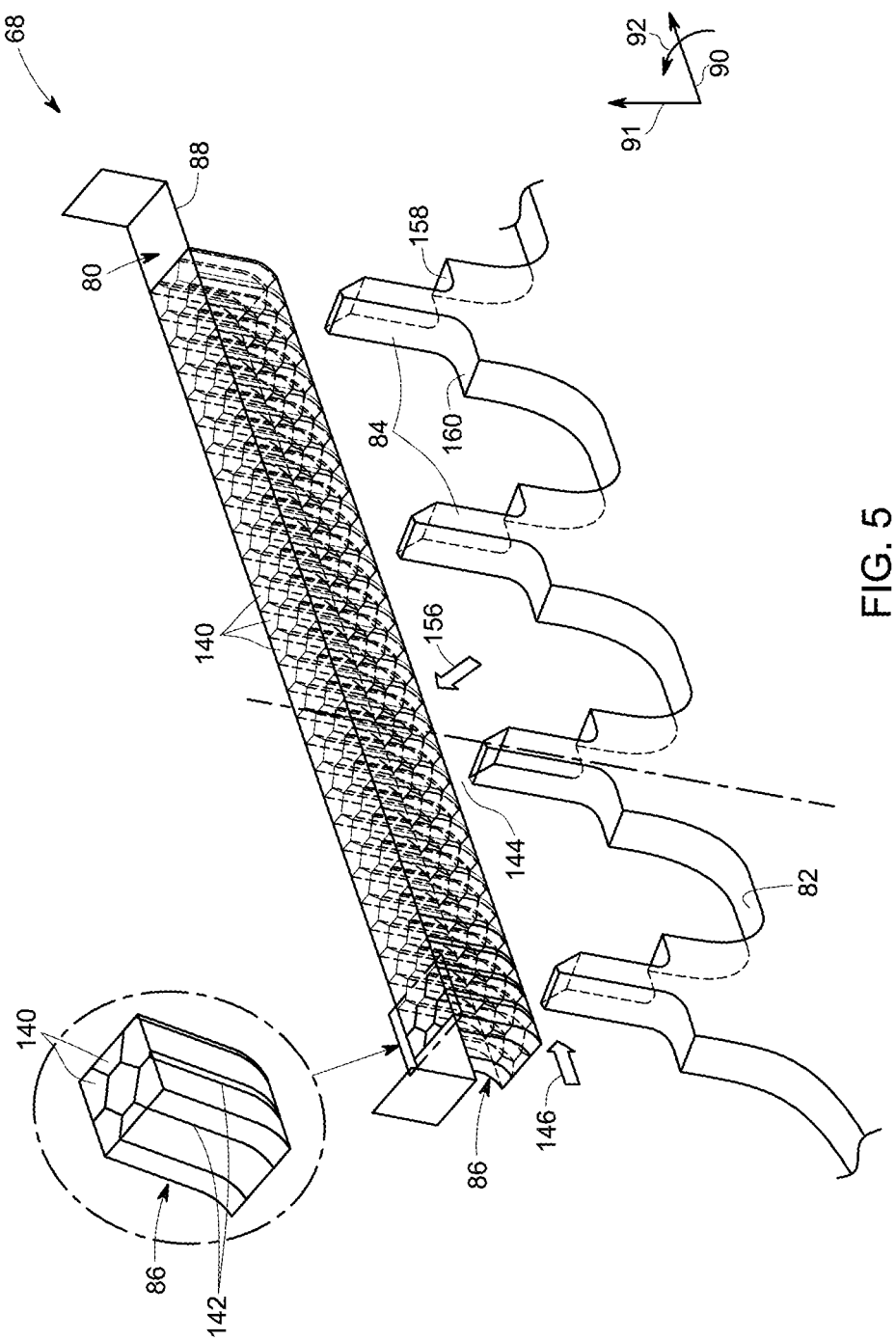
FIG. 5 is a perspective view of a portion of a labyrinth seal system in accordance with the exemplary embodiment of FIG. 1.

FIG. 5 is a perspective view of a portion of a labyrinth seal system 68 in accordance with the exemplary embodiment of FIG. 1. The illustrated portion shows a strip of the labyrinth seal system 68. A plurality of such strips are positioned side by side extending along the circumferential direction 92. As discussed earlier, the labyrinth seal system 68 includes the stationary component 80, the rotatable component 82 including the teeth 84, and the abradable component 86. In the illustrated embodiment, the teeth 84 extend substantially perpendicular from a base 158 of the rotatable component 82. Further, each tooth 84 is joined to the base 158 through a crack arrestor edge portion 160. In certain other embodiments, each tooth 84 may be oriented at a predefined tilt angle relative to the base 158 depending on the application and design criteria.

The abradable component 86 is coupled to the surface 88 of the stationary component 80, facing the teeth 84 of the rotatable component 82. The abradable component 86 includes the plurality of honeycomb cells 140. In one embodiment, the abradable component 86 is formed directly on the surface 88 of the stationary component 80 using an additive manufacturing technique. In another embodiment, the abradable component 86 may be coupled to the surface 88 of the stationary component 80 by brazing.

The rotatable component 82 is disposed proximate to the stationary component 80 to define a clearance 144 between the abradable component 86 and the teeth 84. During operation of the gas turbine engine, the rotatable component 82 is configured to rotate along the circumferential direction

92. A first fluid portion 146 (also referred as a "leakage flow of first fluid portion") flows along the axial direction 90. The rotation of the rotatable component 82 causes a second fluid portion 156 (also referred as a "swirl flow of second fluid portion") to flow along the circumferential direction 92. In one embodiment, the first fluid portion 146 and the second fluid portion 156 are part of a same fluid, such as compressed air received from the compressor 12. The labyrinth seal system 68 is configured to regulate a flow of the first fluid portion 146 through the clearance 144, using the plurality of honeycomb cells 140 and the teeth 84, thereby reducing an amount of the first fluid portion 146 flowing through the clearance 144. In certain embodiments, the labyrinth seal system 68 is configured to prevent the entry of the second fluid portion 156 into the plurality of honeycomb cells 140, using the radial sidewalls 142 of the plurality of honeycomb cells 140 and thereby prevent generation of frictional heat. The stationary component 80 and the rotatable component 82 are made of same material or different material.

As discussed previously, during certain transient operating conditions, the teeth 84 may contact certain portions of the abradable component 86, thereby damaging such portions of the abradable component 86. The damaged abradable component 86 of the type shown in FIG. 5 can be easily removed from the stationary component 80 and replaced by another such abradable component.

Figure 6:
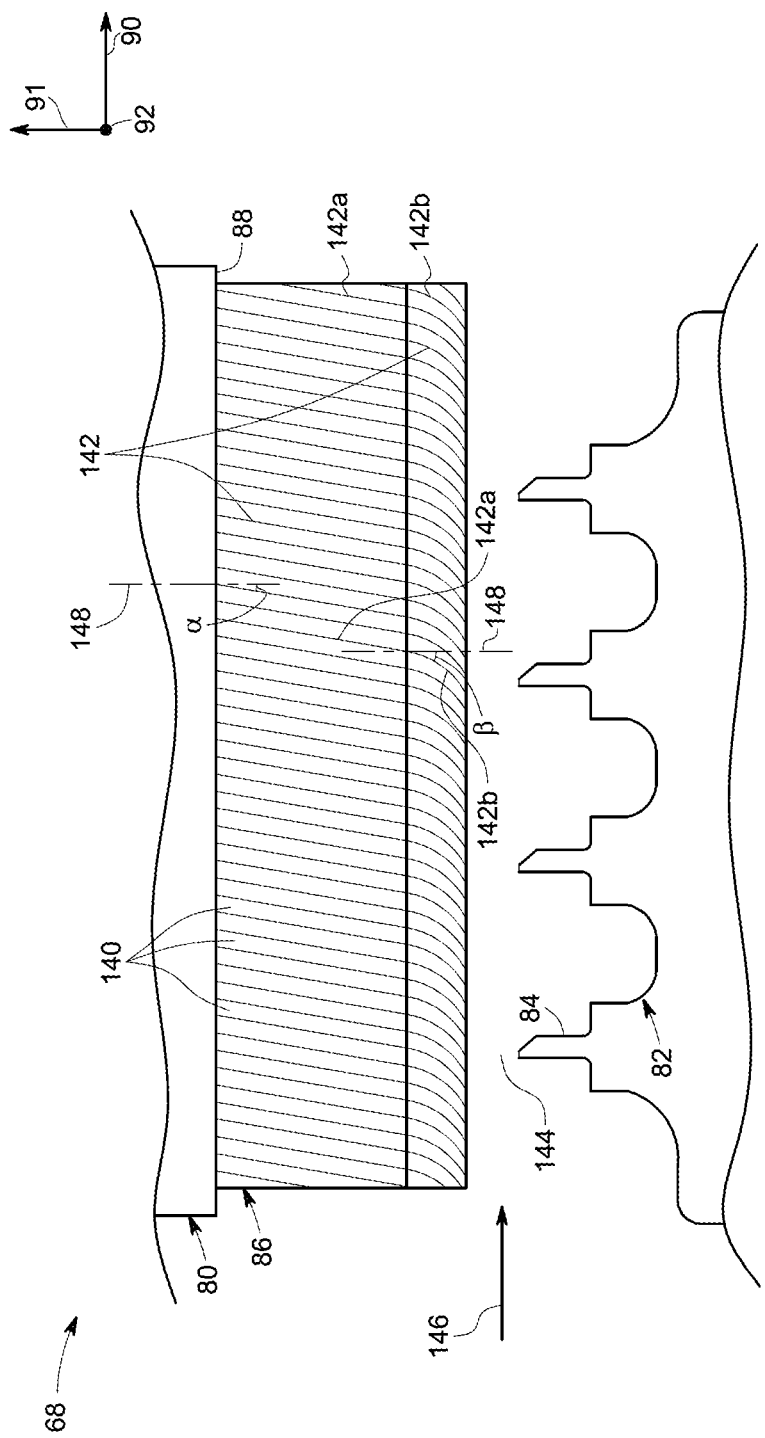
FIG. 6 is a schematic side view of a labyrinth seal system in accordance with the exemplary embodiment of FIG. 5.

FIG. 6 is a schematic side view of the labyrinth seal system 68 in accordance with the exemplary embodiment of FIG. 5. The side view is representative of the labyrinth seal system 68 viewed from the direction of flow of the second fluid portion 156. Each honeycomb cell 140 includes the plurality of radial sidewalls 142. Each radial sidewall 142 includes a first portion 142a and a second portion 142b. The first portion 142a is coupled to the surface 88 of the stationary component 80 and the second portion 142b extends from the first portion 142a towards the clearance 144 defined between the stationary component 80 and the rotatable component 82. In the embodiment of FIG. 6, the first portion 142a is bent relative to a radial axis 148 of the labyrinth seal system 68. In certain embodiments, the first portion 142a is bent at an angle "α" which is in a range from 5 degrees to 15 degrees. The second portion 142b is also bent relative to the radial axis 148 of the labyrinth seal system 68 in the embodiment of FIG. 6. In certain embodiments, the second portion 142b is bent at an angle "β" in a range from 25 degrees to 45 degrees. In one embodiment, the second portion 142b has a radial height in a range from 25 percent to 40 percent of the first portion 142a. In one embodiment, the first portion 142a has a radial height in a range from about 8.1 mm to 10.1 mm. In certain embodiments, the plurality of honeycomb cells 140 is made of stainless steel. Further, the first portion 142a and the second portion 142b may be bent to extend along the axial direction 90 of the abradable component 86.

Figure 7:
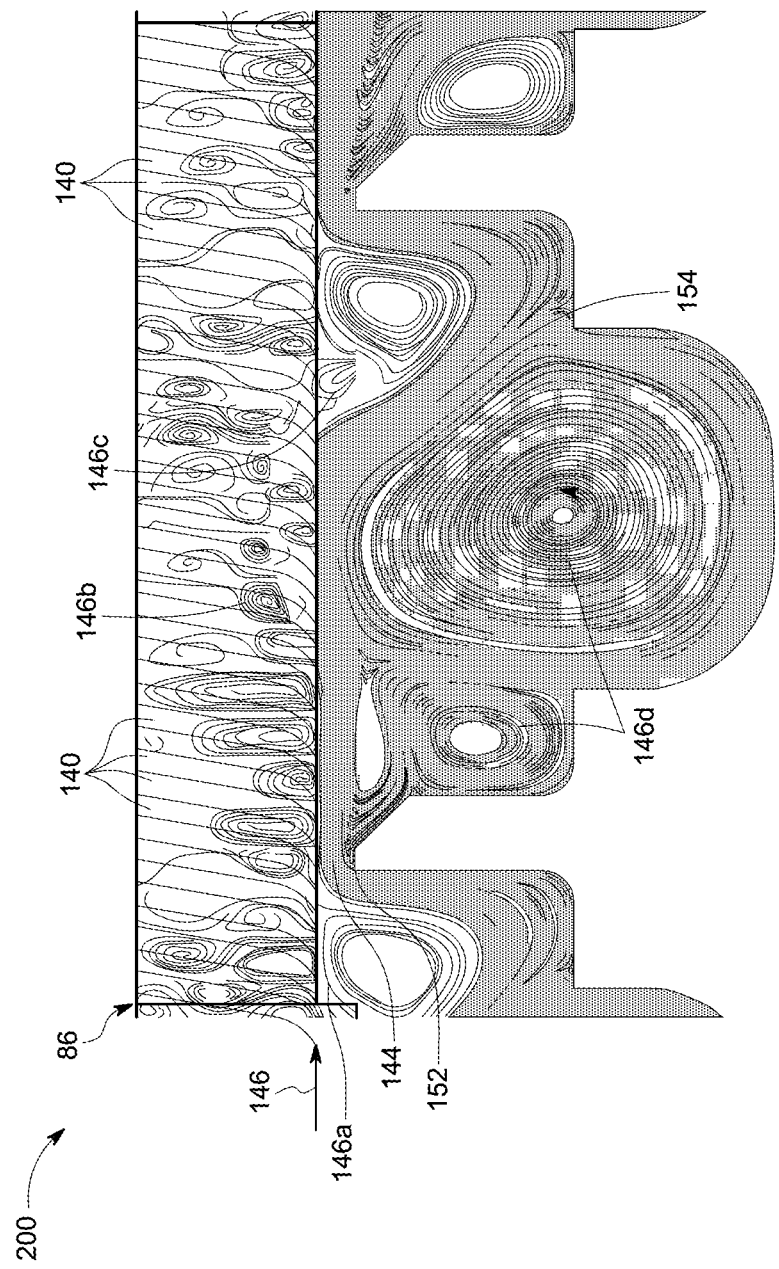
FIG. 7 is a schematic diagram depicting a fluid flow pattern generated by the labyrinth seal system in accordance with the exemplary embodiment of FIG. 6.

FIG. 7 is a schematic diagram depicting a fluid flow pattern 200 generated by the labyrinth seal system 68 in accordance with the embodiment of FIG. 6. The labyrinth seal system 68 is configured to control a flow of the first fluid portion 146 through the clearance 144. The flow of the first fluid portion 146 through the clearance 144 is regulated using the plurality of honeycomb cells 140, the teeth 84, and the plurality of labyrinth seal pockets 154. During operation, flow of the first fluid portion 146 is regulated by diverting a portion 146a of the first fluid portion 146 from the clearance 144 to the plurality of honeycomb cells 140. The second portion 142b of each radial side wall 142 facilitates to divert the portion 146a of the first fluid portion 146 to each honeycomb cell 140. As a result, a first recirculation flow 146b of the portion 146a of the first fluid portion 146 is generated in each honeycomb cell 140.

Further, a portion 146c of the first recirculation flow 146b is diverted from each honeycomb cell 140 to the clearance 144 to regulate the flow of the first fluid portion 146 through the clearance 144. Further, the portion 146c of the first fluid portion 146 is directed against a tip 152 of the teeth 84 to further regulate the flow of the first fluid portion 146 through the clearance 144. In one embodiment, regulating the first fluid portion 146 further involves recirculating another portion 146d of the first fluid portion 146 within each labyrinth seal pocket 154 to regulate the flow of the first fluid portion 146 through the clearance 144.

The labyrinth seal system 68 defines a tortuous flow path for the flow of the first fluid portion 146 resulting in reduction in leakage flow of the first fluid portion 146 through the clearance 144. In certain embodiments, the labyrinth seal system 68 facilitates to reduce the leakage flow of the first fluid portion 146 through the clearance 144 in a range from about 15 percent to about 25 percent compared to a conventional labyrinth seal system.

FIG. 8 is a schematic top view of the abradable component 86 in accordance with one exemplary embodiment. In the illustrated embodiment, each honeycomb cell 140 of the abradable component 86 is a regular hexagonal shaped cell. Each honeycomb cell 140 includes a through-hole 141 defined by the plurality of radial sidewalls 142. In the illustrated embodiment, specifically, each honeycomb cell 140 includes six radial sidewalls 142c, 142d, 142e, 142f, 142g, 142h, which extends along the radial direction 91 of the abradable component 86. The term regular hexagonal shaped cell refers to a cell having a plurality radial sidewalls of same length. In one embodiment, each honeycomb cell 140 further includes an axial width "$W_1$" and a circumferential width "$W_2$". In the illustrated embodiment, the axial width "$W_1$" is defined by mutually opposite radial sidewalls 142c, 142d and the circumferential width "$W_2$" is defined by mutually opposite radial sidewalls 142e, 142f or 142g, 142h. In one embodiment, each regular hexagonal shaped cell 140 has the axial width "$W_1$" or the circumferential width "$W_2$" in a range from ⅛ inch to ¹⁄₃₂ inch.

FIG. 9 is a schematic top view of an abradable component 286 in accordance with another exemplary embodiment. The abradable component 286 includes a plurality of honeycomb cells 240. In the illustrated embodiment, each honeycomb cell 240 is a compressed hexagonal shaped cell. Further, each honeycomb cell 240 includes a through-hole 241 defined by a plurality of radial sidewalls 242. In the illustrated embodiment, specifically, each honeycomb cell 240 includes six radial sidewalls 242a, 242b, 242c, 242d, 242e, 242f, which extends along the radial direction 91 of the abradable component 286. The term compressed hexagonal shaped cell is referred to a cell having a plurality of radial sidewalls 242 having different lengths. For example, the radial sidewall 242b has a length "$L_1$" and the radial sidewall 242d has a length "$L_2$" different from the length "$L_1$". Each honeycomb cell 240 includes an axial width "$W_1$" and a circumferential width "$W_2$". In the illustrated embodiment, the axial width "$W_1$" is defined by mutually opposite radial sidewalls 242a, 242b and the circumferential width "$W_2$" is defined by the mutually opposite radial sidewalls 242c, 242d or 242e, 242f. In one embodiment, the axial width "$W_1$" is in a range from 50 percent to 25 percent of the circumferential width "$W_2$". In the illustrated embodiment, each compressed hexagonal shaped cell 242 has the axial width "$W_1$" of about 1/32 inch and the circumferential width "$W_2$" of about 1/16 inch.

FIG. 10 is a schematic top view of an abradable component 386 in accordance with yet another exemplary embodiment. The abradable component 386 includes a plurality of honeycomb cells 340. In the illustrated embodiment, each honeycomb cell 340 is a compressed hexagonal shaped cell. Each honeycomb cell 340 includes a through-hole 341 defined by a plurality of radial sidewalls 342. Specifically, each honeycomb cell 340 includes six radial sidewalls 342a, 342b, 342c, 342d, 342e, 342f, which extends along the radial direction 91 of the abradable component 386. In the illustrated embodiment, the radial sidewall 342b has a length "$L_1$" and the radial sidewall 342d has a length "$L_2$" different from the length "$L_1$". Each honeycomb cell 340 includes an axial width "$W_1$" and a circumferential width "$W_2$". The axial width "$W_1$" is defined by mutually opposite radial sidewalls 342a, 342b and the circumferential width "$W_2$" is defined by the mutually opposite radial sidewalls 342c, 342d or 342e, 342f. In one embodiment, the axial width "$W_1$" is in a range from 50 percent to 25 percent of the circumferential width "$W_2$". In the illustrated embodiment, each compressed hexagonal shaped cell 342 has the axial width "$W_1$" of about 1/32 inch and the circumferential width "$W_2$" of about 1/8 inch. In certain embodiments, the abradable component 386 has an axial width smaller than the circumferential width. As a result, the number of radial sidewalls along an axial length of the abradable component 386 is increased, resulting in increased frictional flow resistance. In such embodiments, the number of radial side walls along the circumferential length of the abradable component 386 is reduced, resulting in reduced contact of the teeth against the abradable component 386.

Figure 11:
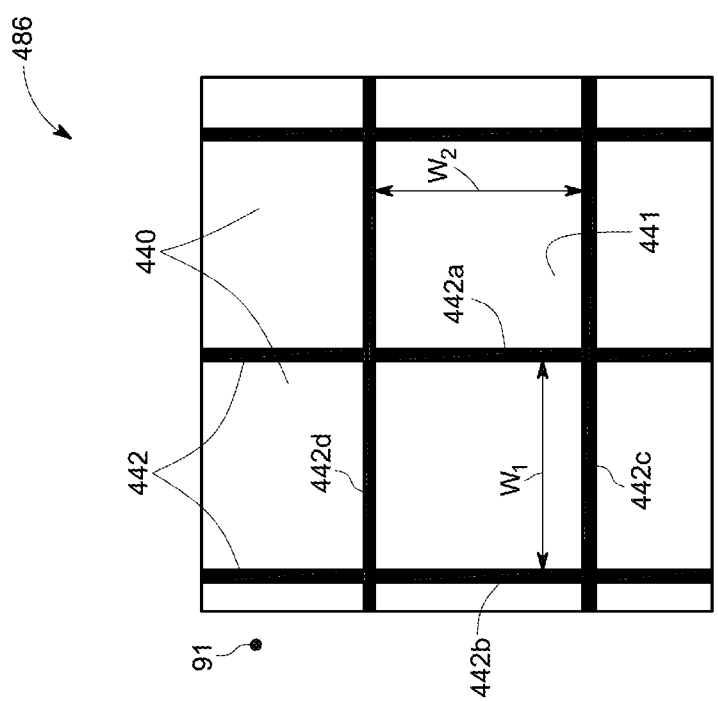
FIG. 11 is a schematic top view of an abradable component having a plurality of square shaped cells in accordance with one exemplary embodiment.

FIG. 11 is a schematic top view of an abradable component 486 in accordance with yet another exemplary embodiment. The abradable component 486 includes a plurality of honeycomb cells 440. In the illustrated embodiment, each honeycomb cell 440 is a square shaped cell. Each honeycomb cell 440 includes a through-hole 441 defined by a plurality of radial sidewalls 442. In the illustrated embodiment, specifically, each honeycomb cell 440 includes four radial sidewalls 442a, 442b, 442c, 442d, which extends along the radial direction 91 of the abradable component 486. In one embodiment, each honeycomb cell 440 includes an axial width "$W_1$" and a circumferential width "$W_2$". In the illustrated embodiment, the axial width "$W_1$" is defined by mutually opposite radial sidewalls 442a, 442b and the circumferential width "$W_2$" is defined by the mutually opposite radial sidewalls 442c, 442d. In the illustrated embodiment, each square shaped cell 442 has the axial width "$W_1$" and the circumferential width "$W_2$" in a range from about 1/8 inch to about 1/32 inch.

Figure 12:
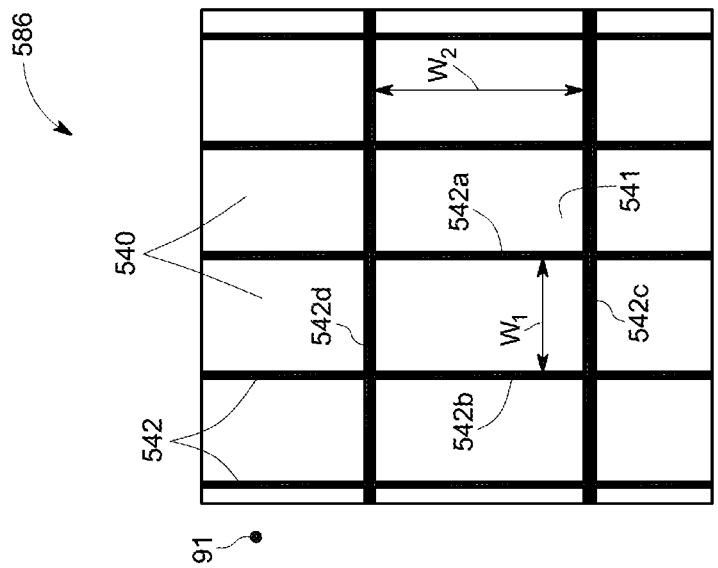
FIG. 12 is a schematic top view of an abradable component having a plurality of rectangular shaped cells in accordance with one exemplary embodiment.

FIG. 12 is a schematic top view of an abradable component 586 in accordance with yet another exemplary embodiment. The abradable component 586 includes a plurality of honeycomb cells 540. In the illustrated embodiment, each honeycomb cell 540 is a rectangular shaped cell. Further, each honeycomb cell 540 includes a through-hole 541 defined by a plurality of radial sidewalls 542. In the illustrated embodiment, each honeycomb cell 540 includes four radial sidewalls 542a, 542b, 542c, 542d, which extends along the radial direction 91 of the abradable component 586. In one embodiment, each honeycomb cell 540 further includes an axial width "$W_1$" and a circumferential width "$W_2$". In the illustrated embodiment, the axial width "$W_1$" is defined by mutually opposite radial sidewalls 542a, 542b and the circumferential width "$W_2$" is defined by the mutually opposite radial sidewalls 542c, 542d. In the illustrated embodiment, each rectangular shaped cell 442 has the axial width "$W_1$" in a range from about 1/16 inch to about 1/32 inch and the circumferential width "$W_2$" in a range from about 1/8 inch to about 1/16 inch.

Figure 13:
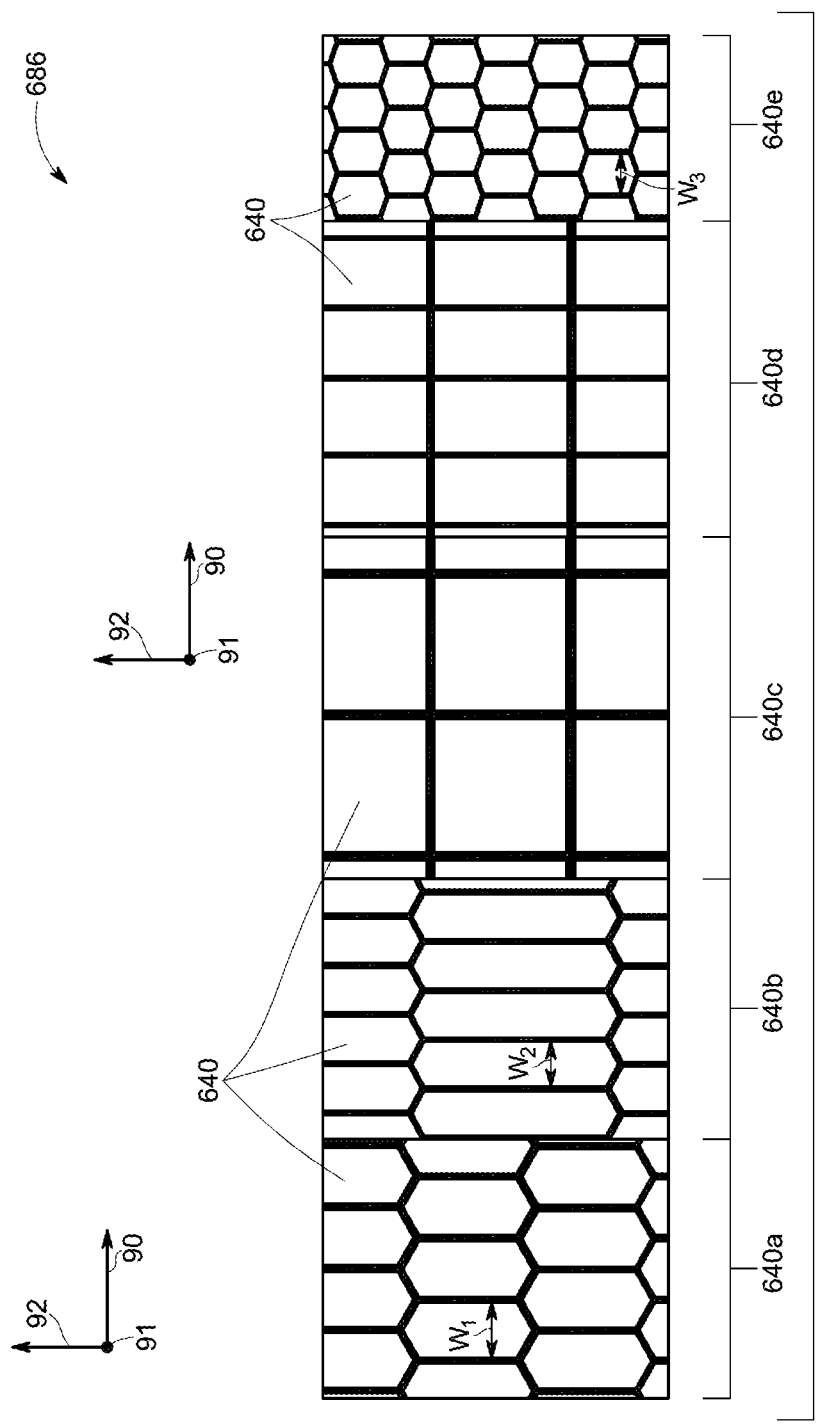
FIG. 13 is a schematic top view of an abradable component in accordance with one exemplary embodiment.

FIG. 13 is a schematic top view of an abradable component 686 in accordance with one exemplary embodiment. The abradable component 686 includes a plurality of honeycomb cells 640. Specifically, the abradable component 686 includes a plurality of compressed hexagonal shaped cells 640a having an axial width "$W_1$" of 1/32 inch, a plurality of compressed hexagonal shaped cells 640b having an axial width "$W_2$" of 1/32 inch, a plurality of square shaped cells 640c, a plurality of rectangular shaped cells 640d, and a plurality of regular shaped hexagonal cells 640e having an axial width "$W_3$" of 1/16 inch. The plurality of honeycomb cells 640 are disposed adjacent to each other along the axial direction 90 and the circumferential direction 92 of the abradable component 686. Further, each honeycomb cell 640 extends along the radial direction 91 of the abradable component 686.

Figure 14:
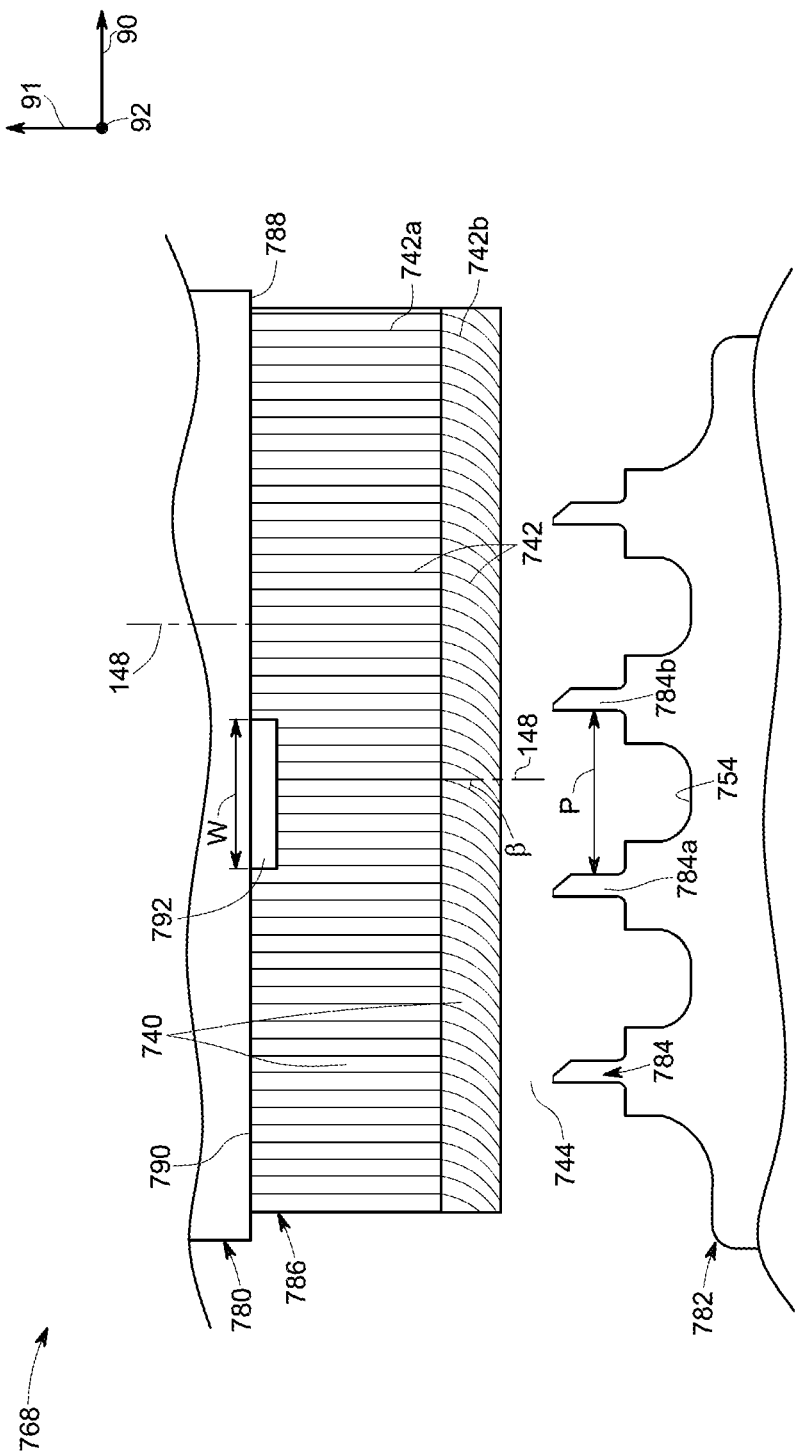
FIG. 14 is a schematic side view of a labyrinth seal system having a plurality of honeycomb cells and a plurality of recirculation grooves in accordance with one exemplary embodiment.

FIG. 14 is a schematic side view of a labyrinth seal system 768 in accordance with one exemplary embodiment. The labyrinth seal system 768 includes a stationary component 780, a rotatable component 782, and an abradable component 786. The abradable component 786 includes a plurality of honeycomb cells 740 disposed facing teeth 784 and a plurality of labyrinth seal pockets 754 of the rotatable component 782. Each honeycomb cell 740 includes a plurality of radial sidewalls 742. Each radial sidewall 742 includes a first portion 742a and a second portion 742b. The first portion 742a is coupled to the surface 788 and the second portion 742b extends from the first portion 742a towards a clearance 744 defined between the stationary component 780 and the rotatable component 782. In one embodiment, the first portion 142a extends along a radial axis 148 of the labyrinth seal system 768. The second portion 142b is bent relative to the radial axis 148 of the labyrinth seal system 768. In the illustrated embodiment, the second portion 142b is bent at an angle "β", which is 30 degrees relative to the radial axis 148. In one embodiment, the second portion 742b has a radial height in a range from 25 percent to 40 percent of the first portion 742a. Further, the second portion 742b is bent to extend along the axial direction 90 of the abradable component 786. The abradable component 786 includes a peripheral side 790 coupled to a surface 788 of the stationary component 780. Further, the abradable component 786 includes a recirculation groove 792 extending inwards from the peripheral side 790 and along the circumferential direction 92 of the abradable component 786. The recirculation groove 792 is positioned in between adjacent teeth 784a, 784b and extends along the axial direction 90. In one embodiment, the width "W" of the circumferential groove 792 is 50 percent to 70 percent of the distance "P" between the adjacent teeth 784a,784b. In the illustrated embodiment, the width "W" is 50 percent of the distance "P" between the adjacent teeth 784a, 784b.

Figure 15:
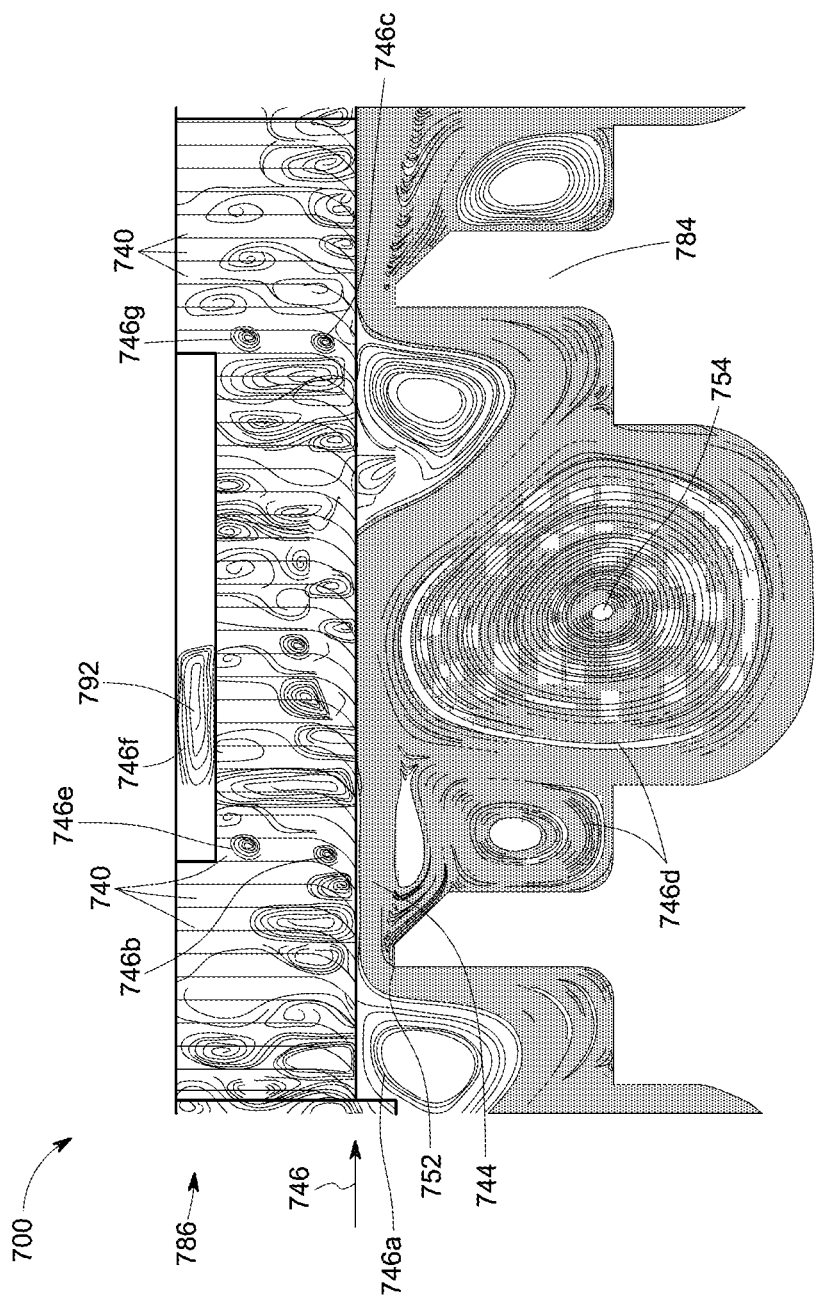
FIG. 15 is a schematic diagram depicting a fluid flow pattern generated by the labyrinth seal system in accordance with the exemplary embodiment of FIG. 14.

FIG. 15 is a schematic diagram depicting a fluid flow pattern 700 generated by the labyrinth seal system 768 in accordance with the embodiment of FIG. 14. The labyrinth seal system 768 is configured to control a flow of a first fluid portion 746 through the clearance 744 using the plurality of honeycomb cells 740, the teeth 784, and the plurality of labyrinth seal pockets 754. In one embodiment, a step of regulating the first fluid portion 746 involves diverting a portion 746a of the first fluid portion 746 from the clearance 744 to the plurality of honeycomb cells 740. In the illustrated embodiment, the second portion 742*b* facilitates to divert the portion 746*a* of the first fluid portion 746 to each honeycomb cell 740. A first recirculation flow 746*b* of the portion 746*a* of the first fluid portion 746 is generated in each honeycomb cell 740.

Further, a portion 746*c* of the first recirculation flow 746*b* is diverted from each honeycomb cell 740 to the clearance 744 to regulate the flow of the first fluid portion 746 through the clearance 744. Further, another portion 746*e* of the first recirculation flow 746*b* from each honeycomb cell 740 is diverted to the recirculation groove 792. Further, a second recirculation flow 746*f* of the portion 746*e* of the first recirculation flow 746*b* is generated in the recirculation groove 792. Further, a portion 746*g* of the second recirculation flow 746*f* is diverted from the recirculation groove 792 to the clearance 744 via the plurality of honeycomb cells 740 to regulate the flow of the first fluid portion 746 through the clearance 744.

Additionally, the portions 746*c*, 746*g* is further directed against a tip 752 of the teeth 784 to regulate the flow of the first fluid portion 746 through the clearance 744. The portion 746*d* of the first fluid portion 746 is recirculated within each labyrinth seal pocket 754 to regulate the flow of the first fluid portion 746 through the clearance 744.

Figure 16:
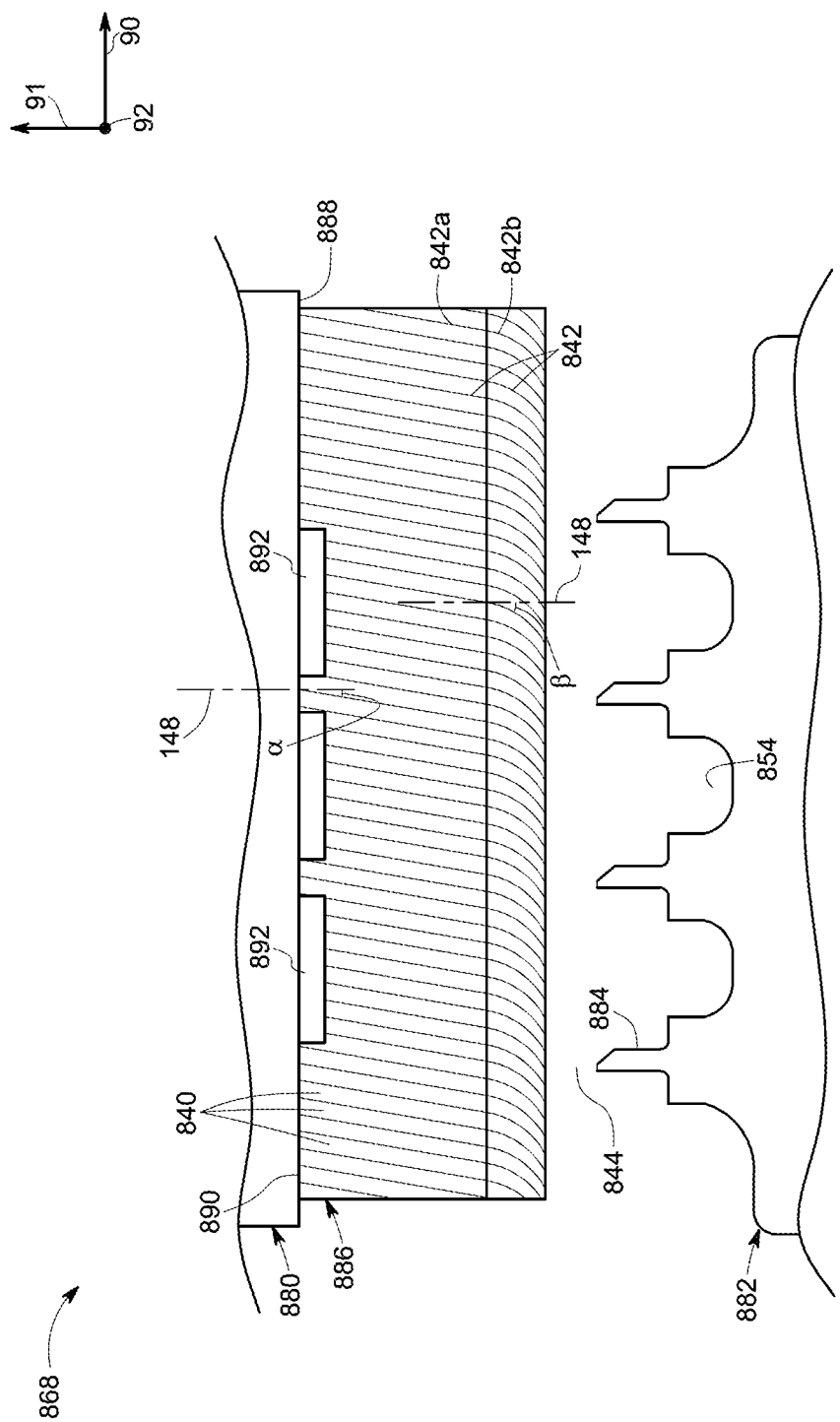
FIG. 16 is a schematic side view of a labyrinth seal system having a plurality of honeycomb cells and a plurality of recirculation grooves in accordance with another exemplary embodiment.

FIG. 16 is a schematic side view of a labyrinth seal system 868 in accordance with another exemplary embodiment. The labyrinth seal system 868 includes a stationary component 880, a rotatable component 882, and an abradable component 886. The abradable component 886 includes a plurality of honeycomb cells 840 disposed facing teeth 884 and a plurality of labyrinth seal pockets 854 of the rotatable component 882. Each honeycomb cell 840 includes the plurality of radial sidewalls 842, where each radial sidewall 842 includes a first portion 842*a* and a second portion 842*b*. The first portion 842*a* is coupled to a surface 888 of the stationary component 880. The second portion 842*b* extends from the first portion 842*a* towards a clearance 844 defined between the stationary component 880 and the rotatable component 882. In one embodiment, the first portion 842*a* is bent at an angle "α" relative to a radial axis 148 of the labyrinth seal system 868 and the second portion 842*b* is bent at an angle "β" relative to the radial axis 148 of the labyrinth seal system 868. The labyrinth seal system 868 includes a peripheral side 890 coupled to the surface 888 of the stationary component 880. Further, the labyrinth seal system 868 includes a plurality of recirculation grooves 892 extending inwards from the peripheral side 890. The plurality of recirculation grooves 892 are spaced apart from each other along the axial direction 90 and extends along the circumferential direction 92 of the abradable component 886. In certain embodiments, the recirculation flow may be enhanced along the axial direction 90 using the plurality of recirculation grooves 892.

Figure 17:
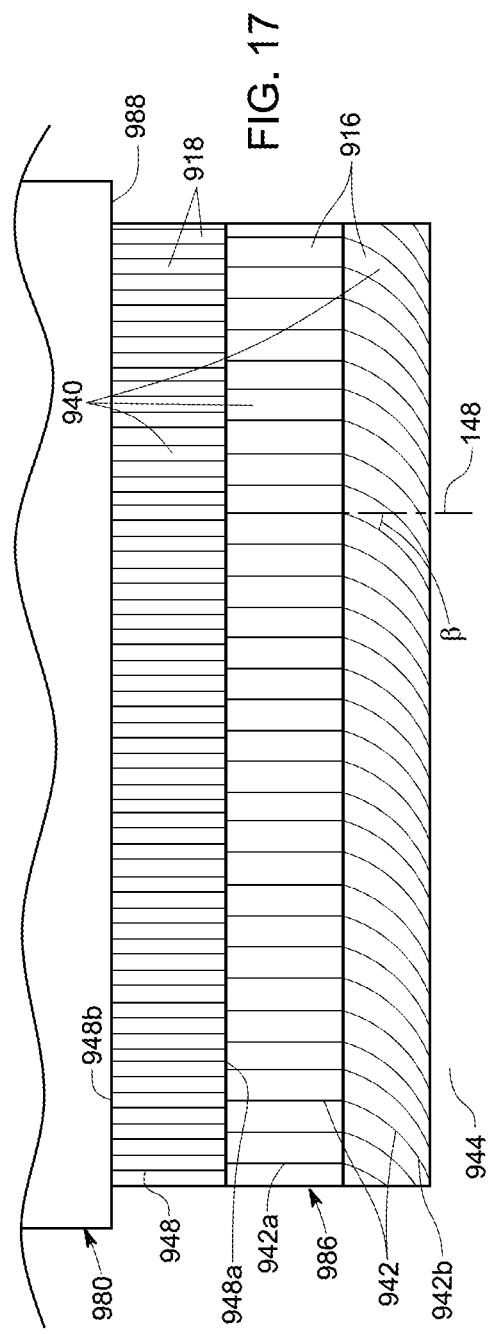
FIG. 17 is a schematic side view of a stationary component and an abradable component having a first set of honeycomb cells and a second set of honeycomb cells in accordance with one exemplary embodiment.

FIG. 17 is a schematic side view of a stationary component 980 and an abradable component 986 in accordance with one exemplary embodiment. The abradable component 986 is coupled to a surface 988 of the stationary component 980. The abradable component 986 includes a plurality of honeycomb cells 940 having a first set of honeycomb cells 916 and a second set of honeycomb cells 918. The first set of honeycomb cells 916 is disposed facing a clearance 944 between the stationary component 980 and a rotatable component (not shown in FIG. 17). The second set of honeycomb cells 918 is disposed facing the surface 988.

The first set of honeycomb cells 916 includes a plurality of radial sidewalls 942, where each radial sidewall 942 includes a first portion 942*a* and a second portion 942*b*. In one embodiment, the first portion 942*a* extends along a radial axis 148 of the labyrinth seal system 968. In one embodiment, the first portion 942*a* may be angled as discussed above with respect to FIG. 6. The second portion 942*b* is bent relative to the radial axis 148 of the labyrinth seal system 768. In the illustrated embodiment, the second portion 942*b* is bent at an angle "β", which in one specific embodiment is 30 degrees relative to the radial axis 148. The second set of honeycomb cells 918 includes a plurality of radial sidewalls 948. In one embodiment, the second set of honeycomb cells 918 extends along the radial axis 148 of the labyrinth seal system 968 or may optionally be angled with reference to the radial axis 148. A first end 948*a* of the second set of honeycomb cells 918 is coupled to the first set of honeycomb cells 916 and a second end of 948*b* of the second set of honeycomb cells 918 is coupled to the surface 988. Specifically, the first end 948*a* of the second set of honeycomb cells 918 is coupled to the first portion 942*a* of the first set of honeycomb cells 916.

Figure 18:
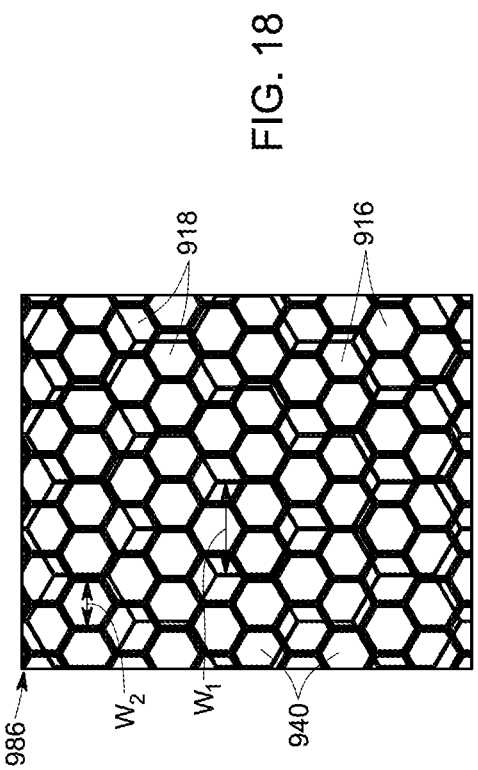
FIG. 18 is a schematic top view of the abradable component in accordance with the exemplary embodiment of FIG. 17.

FIG. 18 is a schematic top view of the abradable component 986 in accordance with the exemplary embodiment of FIG. 17. In the specific embodiment of FIGS. 17 and 18, each honeycomb cell 916 has a first axial width "$W_1$" and each honeycomb cell 918 has a second axial width "$W_2$" different from the first axial width "$W_1$". In the illustrated embodiment, specifically, the first width "$W_1$" is greater than the second width "$W_2$" to generate a tortuous flow path for the recirculation flow and thereby improve the regulation of the first fluid portion.

Figure 19:
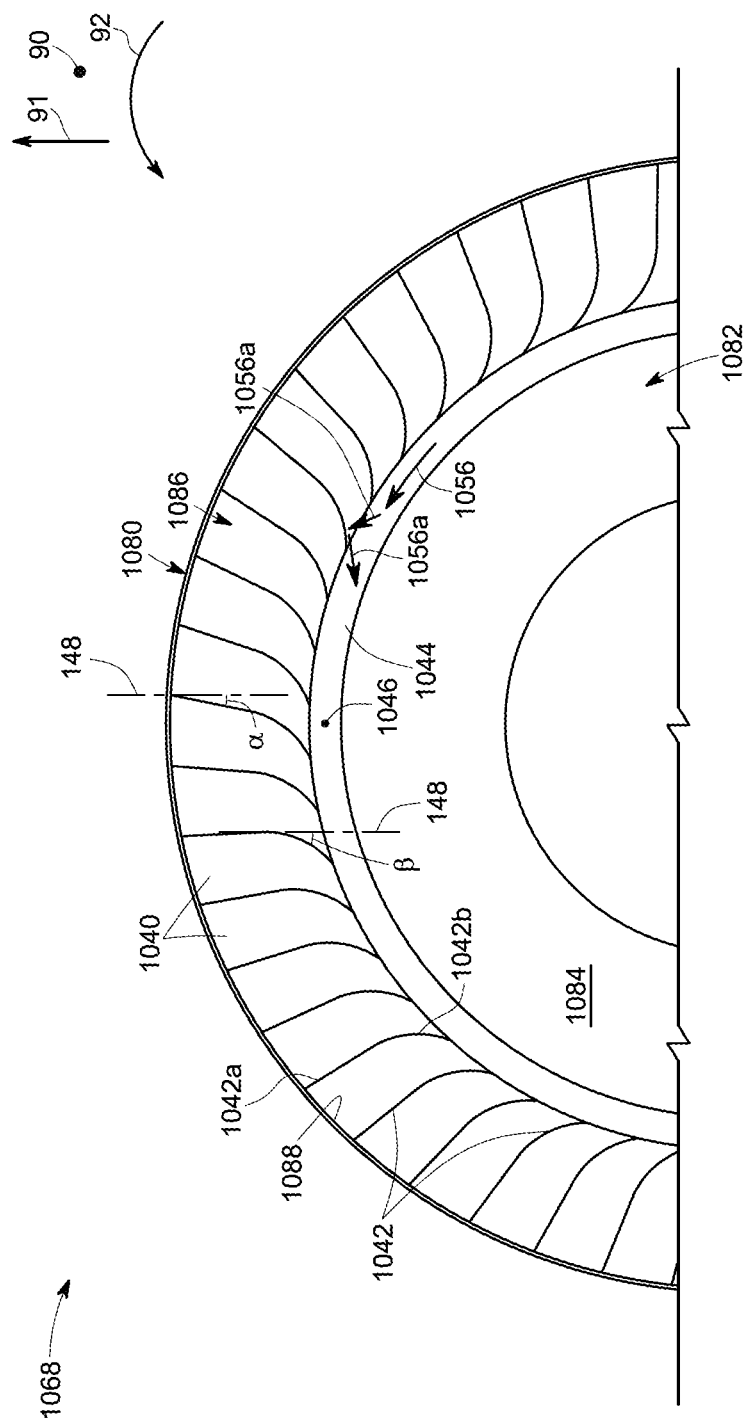
FIG. 19 is a schematic side view of a labyrinth seal system in accordance with one exemplary embodiment.

FIG. 19 is a schematic side view of a labyrinth seal system 1068 in accordance with one exemplary embodiment. The side view is a representative of the labyrinth seal system 1068 viewed from a direction of flow of a first fluid portion 1046.

The labyrinth seal system 1068 includes a stationary component 1080, a rotatable component 1082, and an abradable component 1086. The abradable component 1086 includes a plurality of honeycomb cells 1040 disposed facing teeth 1084 and a plurality of labyrinth seal pockets (not shown in FIG. 19) of the rotatable component 1082. Each honeycomb cell 1040 includes the plurality of radial sidewalls 1042, where each radial sidewall 1042 includes a first portion 1042*a* and a second portion 1042*b*. The first portion 1042*a* is coupled to a surface 1088 of the stationary component 1080. The second portion 1042*b* extends from the first portion 1042*a* towards a clearance 1044 defined between the stationary component 1080 and the rotatable component 1082. The first portion 1042*a* is bent relative to a radial axis 148 of the labyrinth seal system 1068. Specifically, the first portion 1042*a* is bent at an angle "α" which is in a range from 5 degrees to 15 degrees. The second portion 1042*b* is bent relative to the radial axis 148 of the labyrinth seal system 1068. Specifically, the second portion 1042*b* is bent at an angle "β" which in a range from 25 degrees to 45 degrees. In one embodiment, the second portion 1042*b* has a radial height in a range from 25 percent to 40 percent of the first portion 1042*a*. Further, the first portion 1042*a* and the second portion 1042*b* are bent to extend along the circumferential direction 92 of the abradable component 1086.

During operation, the first fluid portion 1046 flows along the axial direction 90 of the abradable component 1086 and a second fluid portion 1056 flows along the circumferential direction 92 of the abradable component 1086. The flow of the second fluid portion 1056 is generated by the rotation of the rotatable component 1082. In such an embodiment, a portion 1056*a* of the second fluid portion 1056 is deflected along the second portion 1042b to the clearance 1044 for preventing the portion 1056a of the second fluid portion 1056 from entering into the plurality of honeycomb cells 1040 and thereby preventing generation of frictional heat. In one or more embodiments, the second portion 1042b does not obstruct and entrap the flow of the second fluid 1056, thereby preventing generation of frictional heat since the second portion 1042b is angled (bent) away from the flow of the second fluid 1056.

Figure 20:
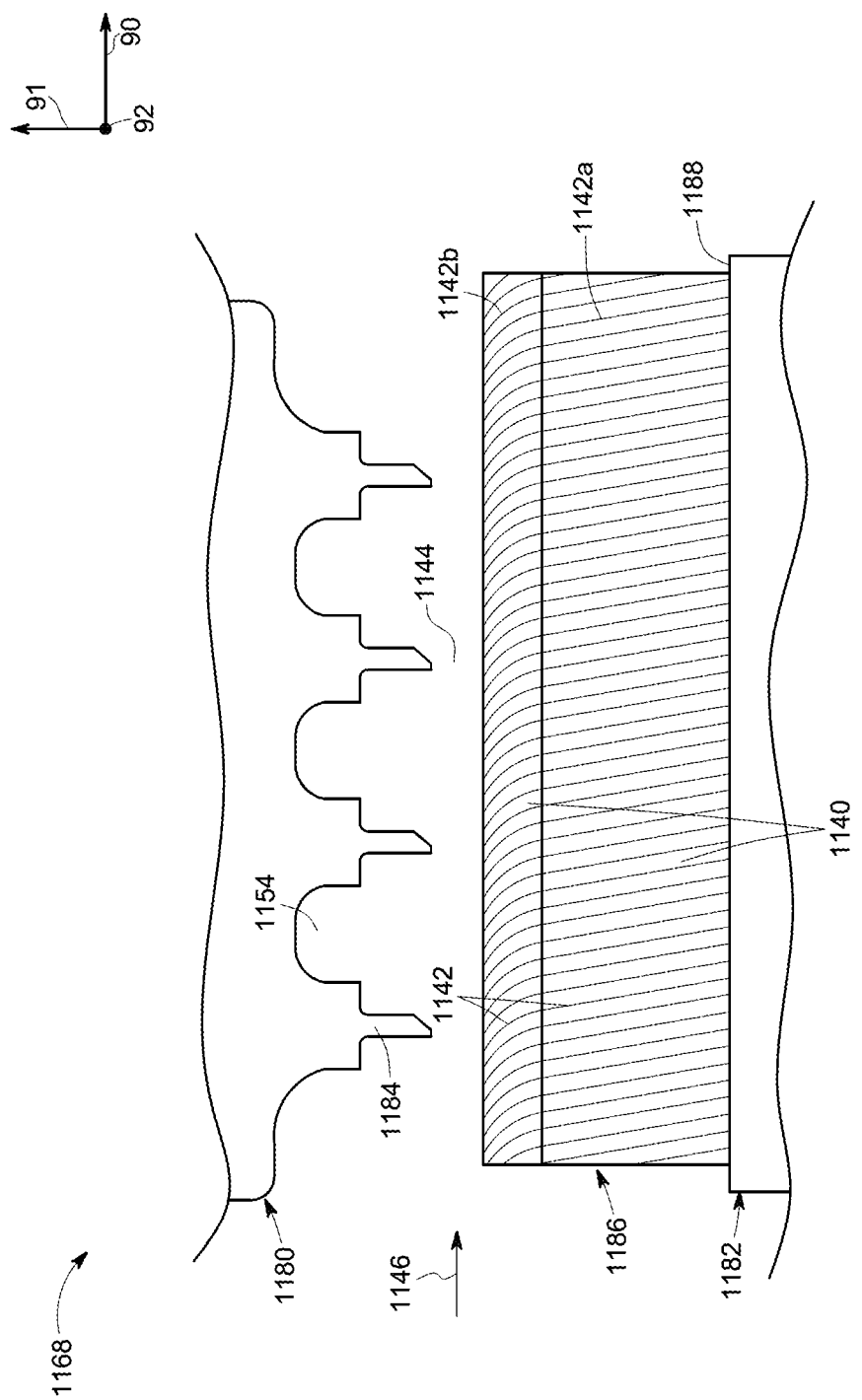
FIG. 20 is a schematic side view of the labyrinth seal system in accordance with one exemplary embodiment.

FIG. 20 is a schematic diagram of a portion of a labyrinth seal system 1168 shown in accordance with an exemplary embodiment. The labyrinth seal system 1168 includes a rotatable component 1182 and a stationary component 1080 having teeth 1184, and an abradable component 1186.

The stationary component 1180 further includes a plurality of labyrinth seal pockets 1154 defined between teeth 1184. In the illustrated embodiment, the abradable component 1186 is coupled to a surface 1188 of the rotatable component 1182. The abradable component 1186 includes a plurality of honeycomb cells 1140 disposed facing the teeth 1184 and the plurality of labyrinth seal pockets 1154. Each honeycomb cell 1140 includes a plurality of radial side walls 1142, where each side wall includes a first portion 1142a and a second portion 1142b, which are bent to extend along the axial direction 90 of the abradable component 1186.

The rotatable component 1182 is disposed proximate to the stationary component 1080 to define a clearance 1144 between the abradable component 1186 and the teeth 1184. During operation of the gas turbine engine, the rotatable component 1182 is configured to rotate along the circumferential direction 92 and a first fluid portion 1146 (also referred as "a leakage flow of first fluid portion") flows along an axial direction 90 of the labyrinth seal system 1168. The labyrinth seal system 1168 is configured to regulate a flow of the first fluid portion 1146 through the clearance 1144, using the plurality of honeycomb cells 1140, the teeth 1184, and the plurality of labyrinth seal pockets 1154. In one embodiment, the first fluid portion 1146 is an exhaust gas received from the combustor or the turbine.

Figure 21:
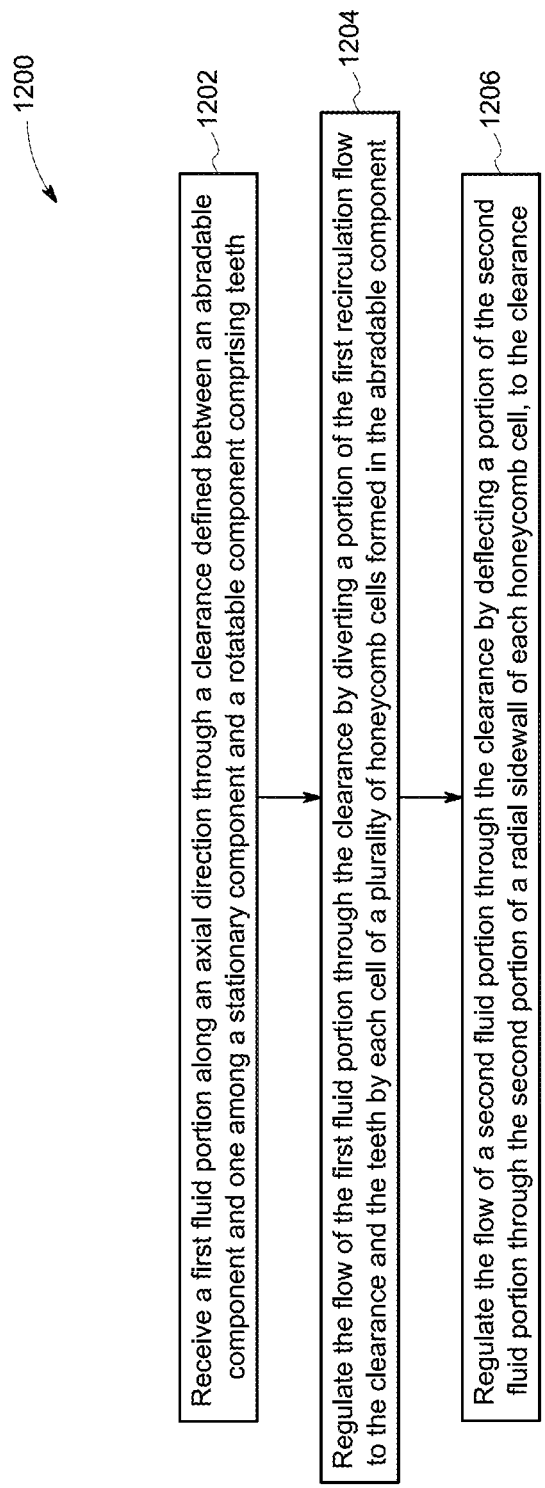
FIG. 21 is a flow diagram of a method for controlling flow of a fluid through a labyrinth seal system in accordance with one exemplary embodiment.

FIG. 21 is a flow diagram of a method 1200 for controlling flow of a fluid through a labyrinth seal system in accordance with one exemplary embodiment. In one embodiment, the fluid is compressed air received from a compressor. In another embodiment, the fluid may include an exhaust gas stream received from a combustor or a turbine.

The method 1200 involves receiving a first fluid portion along an axial direction through a clearance defined between an abradable component and one among a stationary component and a rotatable component having teeth in step 1202. The abradable component is coupled to a surface of other of the stationary and rotatable components. The abradable component is disposed facing the teeth. The abradable component includes a plurality of honeycomb cells disposed adjacent to each other along an axial direction and a circumferential direction of the abradable component. Each honeycomb cell includes a plurality of radial sidewalls, where each radial sidewall includes a first portion coupled to the surface and a second portion extending from the first portion towards the clearance. The second portion is bent relative to a radial axis of the labyrinth seal system.

In one embodiment, the first portion is bent relative to a radial axis of the labyrinth seal system and the second portion is bent relative to the radial axis of the labyrinth seal system. Further, in one embodiment, the first portion and the second portion are bent to extend along the axial direction of the abradable component. In another embodiment, the first portion and the second portion are bent to extend along the circumferential direction of the abradable component.

The method 1200 further involves regulating the flow of the first fluid portion through the clearance, using the plurality of honeycomb cells and the teeth in step 1204. A portion of the first fluid portion is diverted from the clearance to each honeycomb cell of the plurality of honeycomb cells. Further, a first recirculation flow of the portion of the first fluid portion is generated in each honeycomb cell. The flow of the first fluid portion through the clearance is regulated by diverting a portion of the first recirculation flow to the clearance and the teeth.

In another embodiment, another portion of the first recirculation flow from each honeycomb cell is diverted to a recirculation groove. Further a second recirculation flow from a portion of the first recirculation flow is generated in the recirculation groove of the abradable component. The flow of the first fluid portion through the clearance is further regulated by diverting the second recirculation flow to the clearance and the teeth.

In yet another embodiment, the method 1200 further involves a step of regulating the flow of a second fluid portion through the clearance in step 1206. A portion of the second fluid portion is deflected along a second portion of the radial side walls to the clearance for preventing the portion of the second fluid portion from entering into the plurality of honeycomb cells and thereby prevent generation of frictional heat.

Figure 22:
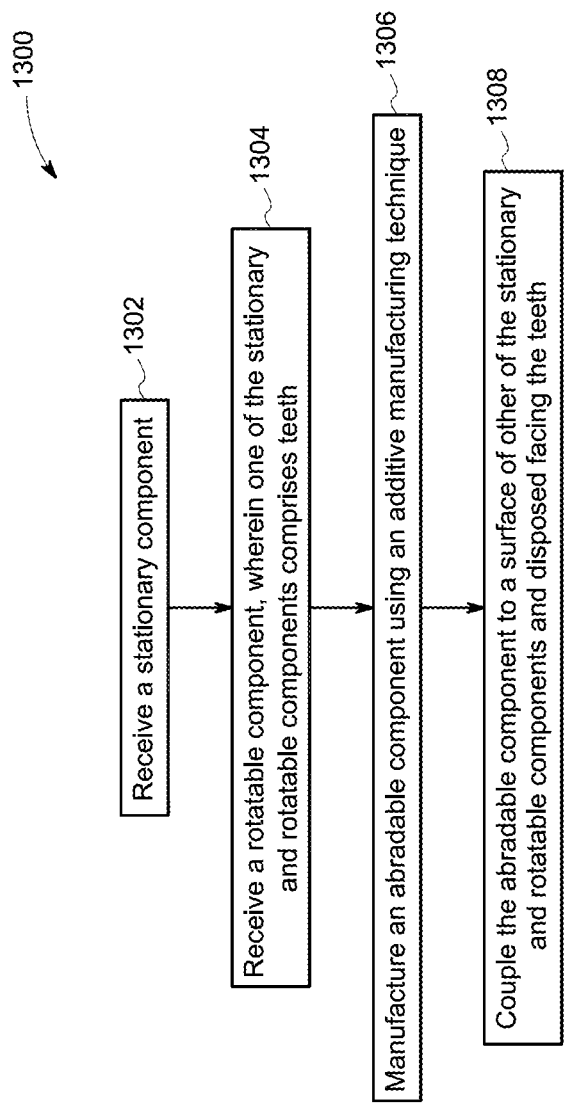
FIG. 22 is a flow diagram of a method of manufacturing a labyrinth seal system in accordance with one exemplary embodiment.

FIG. 22 is a flow diagram of a method 1300 of manufacturing a labyrinth seal system in accordance with one exemplary embodiment. The method 1300 involves receiving a stationary component in step 1302. The method 1300 further involves receiving a rotatable component in step 1304. In such an embodiment, one among the stationary and rotatable components includes teeth.

Further, the method 1300 involves manufacturing an abradable component using an additive manufacturing technique in step 1306. In one embodiment, a digital representation of the labyrinth seal system is generated. The digital representation includes an abradable component having a plurality of honeycomb cells disposed adjacent to each other along an axial direction and a circumferential direction of the abradable component. Further, each honeycomb cell includes a plurality of radial sidewalls, where each radial sidewall includes a first portion and a second portion extending from the first portion. Further, at least the second portion is bent relative to a radial axis of the labyrinth seal system. At step 1306, a stack of layers is generated based on the digital representation of the abradable component of the labyrinth seal system. Specifically, the method involves sequentially adding and consolidating material of each layer to form the abradable component of the labyrinth seal system.

In one embodiment, the additive manufacturing technique may be defined as a process of joining materials, usually layer upon layer, to make one or more objects from digital data such as 3D CAD (Computer Aided Design) model data. An additive manufacturing technique involves directly manufacturing components based on at least three inputs: i) a raw material (often in the form of powder or wire), ii) energy for consolidation of the raw material (often a laser beam, electron beam, or arc source for metals processes, and iii) a digital representation (CAD model) of the component. Examples of additive manufacturing techniques include but are not limited to powder-bed methods such as selective laser melting, direct metal laser sintering, and electron-beam melting or 3-dimensional ink jet printing as well as powder or wire-fed methods such as 3-dimensional cladding or laser forming.

The powder-bed additive manufacturing technique involves combining precision powder-bed formation for material deposition with high-resolution laser or electron-beam micro-welding for material consolidation of fine, uniformly sized powders. For example, during a selective laser melting process, a uniformly thick layer of metal powder is first spread on a suitable metal substrate and then a laser beam is scanned across the powder bed in a specified pattern so as to attach the layer to the build substrate. The steps of powder spreading and laser micro-welding are then repeated layer after layer until the part is completed. Internal passages, cavities or lattice macrostructures are readily generated by leaving the loose powder material unconsolidated in specified regions for removal after the construction of layers is completed.

Powder-bed or wire-fed 3-dimensional cladding processes are performed by directing a laser beam, electron beam, or arc source to a substrate to generate a melt pool and then powder or wire material is added to the melt pool. The beam is directed to the melt pool of the substrate while material is continuously added to the melt pool to generate a desired geometry. During a powder laser forming process, a laser beam is directed to heat the substrate to produce a melt pool and then metal powder is sprayed from a powder delivery nozzle to the melt pool to produce a consolidated material. Once an initial layer is formed, the steps are repeated layer after layer until the part is formed. The method 1300 further involves coupling the abradable component to a surface of other of the stationary and rotatable components and disposed facing the teeth at step 1308. In one embodiment, the abradable component is formed directly on the surface of other of the stationary and rotatable components, using the additive manufacturing technique. In another embodiment, the abradable component is coupled to the surface of other of the stationary and rotatable components by brazing.

In accordance with one or more embodiments discussed herein, an exemplary labyrinth seal system is configured to control a flow of fluid through a clearance defined between an abradable component and one of a rotatable component and a stationary component having teeth. The exemplary labyrinth seal system is further configured to control generation of frictional heat by deflecting a portion of a fluid along a portion of each radial sidewall to the clearance, thereby preventing the portion of the fluid from entering into a plurality of honeycomb cells. The abradable component is coupled to a surface of one of the stationary and rotatable components, thereby reducing the risk of damaging the stationary component or the rotatable component during transient operating conditions.

While only certain features of embodiments have been illustrated and described herein, many modifications and changes will occur to those skilled in the art. It is, therefore, to be understood that the appended embodiments are intended to cover all such modifications and changes as falling within the spirit of the invention.

The invention claimed is:

1. A labyrinth seal system comprising:
   a stationary component;
   a rotatable component, wherein one of the stationary component or the rotatable component, comprises teeth; and
   an abradable component coupled to a surface of the other of the stationary component or the rotatable component and disposed facing the teeth, wherein the abradable component comprises a plurality of honeycomb cells disposed adjacent to each other along an axial direction and a circumferential direction of the abradable component, wherein each honeycomb cell comprises a plurality of radial sidewalls disposed about a cavity and extending radially inward away from the surface to a distal end at a clearance between the stationary component and the rotatable component, wherein each radial sidewall comprises a first portion and a second portion, wherein the first portion is radially between the surface and the second portion, wherein the second portion of each radial sidewall defines a continuous curve, and wherein each cavity is defined by at least one respective pair of mutually opposite radial sidewalls of the plurality of radial sidewalls such that each cavity is curved along each mutually opposite radial sidewall of the respective pair of mutually opposite radial sidewalls.

2. The labyrinth seal system of claim 1, wherein a tangent line along the continuous curve of the second portion is at an angle in a range from 25 degrees to 45 degrees relative to a radial axis of the labyrinth seal system.

3. The labyrinth seal system of claim 1, wherein at least one cell of the plurality of honeycomb cells comprises a regular hexagonal shaped cell having an axial width ($W_1$) or a circumferential width ($W_2$) in a range from ⅛ inch to 1/32 inch.

4. The labyrinth seal system of claim 1, wherein at least one cell of the plurality of honeycomb cells comprises a compressed hexagonal shaped cell having an axial width ($W_1$) in a range from 50 percent to 25 percent of a circumferential width ($W_2$).

5. The labyrinth seal system of claim 1, wherein at least one cell of the plurality of honeycomb cells comprises a square or a rectangular shaped cell.

6. The labyrinth seal system of claim 1, wherein the first portion is bent at an angle in a range from 5 degrees to 15 degrees relative to a radial axis of the labyrinth seal system.

7. The labyrinth seal system of claim 1, wherein the abradable component further comprises:
   a peripheral side coupled to the surface; and
   at least one recirculation groove extending inwards from the peripheral side and along the circumferential direction of the abradable component.

8. The labyrinth seal system of claim 1, wherein the plurality of honeycomb cells comprises:
   a first set of honeycomb cells disposed facing the clearance, wherein each honeycomb cell of the first set of honeycomb cells has a first axial width ($W_1$); and
   a second set of honeycomb cells disposed facing the surface, wherein each honeycomb cell of the second set of honeycomb cells has a second axial width ($W_2$) different from the first axial width ($W_1$).

9. The labyrinth seal system of claim 1, wherein the continuous curve extends along the axial direction of the abradable component.

10. The labyrinth seal system of claim 1, wherein the continuous curve extends along the circumferential direction of the abradable component.

11. A gas turbine engine comprising:
    a compressor;
    a combustor coupled to the compressor;
    a turbine coupled to the combustor and the compressor; and a labyrinth seal system disposed at a pre-defined location in the gas turbine engine, wherein the labyrinth seal system comprises:
a stationary component;
a rotatable component, wherein one of the stationary component or the rotatable component comprises teeth, and
an abradable component coupled to a surface of the other of the stationary component or the rotatable component and disposed facing the teeth, wherein the abradable component comprises a plurality of honeycomb cells disposed adjacent to each other along an axial direction and a circumferential direction of the abradable component, wherein each honeycomb cell comprises a plurality of radial sidewalls disposed about a cavity and extending radially inward away from the surface to a distal end at a clearance between the stationary component and the rotatable component, wherein each radial sidewall comprises a first portion and a second portion, wherein the first portion is radially between the surface and the second portion, wherein the second portion of each radial sidewall defines a continuous curve, and wherein each cavity is defined by at least one respective pair of mutually opposite radial sidewalls of the plurality of radial sidewalls such that each cavity is curved along each mutually opposite radial sidewall of the respective pair of mutually opposite radial sidewalls.

12. The gas turbine engine of claim 11, wherein a tangent line along the continuous curve of the second portion is at an angle in a range from 25 degrees to 45 degrees relative to a radial axis of the labyrinth seal system.

13. The gas turbine engine of claim 11, wherein the plurality of honeycomb cells comprises at least one of:
a regular hexagonal shaped cell having an axial width ($W_1$) or a circumferential width ($W_2$) in a range from ⅛ inch to 1/32 inch;
a rectangular shaped cell;
a square shaped cell; or
a compressed hexagonal shaped cell having an axial width ($W_1$) in a range from 50 percent to 25 percent of a circumferential width ($W_2$).

14. The gas turbine of claim 11, wherein the first portion is bent at an angle in a range from 5 degrees to 15 degrees relative to a radial axis of the labyrinth seal system.

15. The gas turbine of claim 11, wherein the abradable component further comprises:
a peripheral side coupled to the surface; and
at least one recirculation groove extending inwards from the peripheral side and along the circumferential direction of the abradable component.

16. The gas turbine engine of claim 11, wherein the plurality of honeycomb cells comprises:
a first set of honeycomb cells disposed facing the clearance, wherein each honeycomb cell of the first set of honeycomb cells has a first axial width ($W_1$); and
a second set of honeycomb cells disposed facing the surface, wherein each honeycomb cell of the second set of honeycomb cells has a second axial width ($W_2$) different from the first axial width ($W_1$).

17. The gas turbine engine of claim 11, wherein the pre-defined location comprises at least one of:
a first leakage flow path extending from the compressor to the turbine bypassing the combustor;
a second leakage flow path extending between a tip of a rotor blade and a casing of the turbine;
a third leakage flow path extending between a tip of a stator blade and a spacer wheel of the turbine; or
a fourth leakage flow path extending between a bearing housing and the rotatable component of the turbine.

18. The gas turbine engine of claim 11, wherein the labyrinth seal system comprises a plurality of labyrinth seal systems and wherein the pre-defined location comprises a first leakage flow path extending from the compressor to the turbine bypassing the combustor; and
wherein the pre-defined location further comprises a plurality of locations in the turbine, wherein the labyrinth seal system defines a second leakage flow path extending between a tip of a rotor blade and a casing of the turbine, a third leakage flow path extending between a tip of a stator blade and a spacer wheel of the turbine, and a fourth leakage flow path extending between a bearing housing and the rotatable component of the turbine.

19. The gas turbine engine of claim 11, wherein the continuous curve extends along the axial direction of the abradable component.

20. The gas turbine engine of claim 11, wherein the continuous curve extends along the circumferential direction of the abradable component.

21. A method of manufacturing a labyrinth seal system comprising a stationary component and a rotatable component, wherein one of the stationary component or the rotatable component comprises teeth, the method comprising:
manufacturing an abradable component using an additive manufacturing technique; and
coupling the abradable component to a surface of the other of the stationary component or the rotatable component and disposed facing the teeth,
wherein the abradable component comprises a plurality of honeycomb cells disposed adjacent to each other along an axial direction and a circumferential direction of the abradable component, wherein each honeycomb cell comprises a plurality of radial sidewalls disposed about a cavity and extending radially inward away from the surface to a distal end at a clearance between the stationary component and the rotatable component, wherein each radial sidewall comprises a first portion and a second portion, wherein the first portion is radially between the surface and the second portion, wherein the second portion of each radial sidewall defines a continuous curve, and wherein each cavity is defined by at least one respective pair of mutually opposite radial sidewalls of the plurality of radial sidewalls such that each cavity is curved along each mutually opposite radial sidewall of the respective pair of mutually opposite radial sidewalls.

22. The method of claim 21, wherein manufacturing and coupling the abradable component comprises directly forming the abradable component on the surface of the other of the stationary component or the rotatable component, using the additive manufacturing technique.

23. The method of claim 21, wherein coupling the abradable component comprises coupling the abradable component to the surface of the other of the stationary component or the rotatable component by brazing.

* * * * *